US011003568B2

(12) United States Patent
Smith et al.

(10) Patent No.: US 11,003,568 B2
(45) Date of Patent: May 11, 2021

(54) ERROR RECOVERY

(71) Applicant: Manhattan Engineering Incorporated, San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Manhattan Engineering Incorporated, San Francisco, CA (US)

( * ) Notice: Subject to any disclaimer, the term of this patent is extended or adjusted under 35 U.S.C. 154(b) by 0 days.

(21) Appl. No.: 16/579,753

(22) Filed: Sep. 23, 2019

(65) Prior Publication Data

US 2020/0097389 A1     Mar. 26, 2020

Related U.S. Application Data

(60) Provisional application No. 62/735,026, filed on Sep. 22, 2018.

(51) Int. Cl.
*G06F 11/36* (2006.01)
*G06F 11/07* (2006.01)
*G06N 3/04* (2006.01)
*G06K 9/62* (2006.01)

(52) U.S. Cl.
CPC ...... *G06F 11/3636* (2013.01); *G06F 11/0775* (2013.01); *G06F 11/0793* (2013.01); *G06F 11/366* (2013.01); *G06K 9/6256* (2013.01); *G06N 3/04* (2013.01)

(58) Field of Classification Search
CPC ............... G06F 11/3636; G06F 11/366; G06F 11/0775; G06F 11/0793; G06K 9/6256; G06N 3/04
See application file for complete search history.

(56) References Cited

U.S. PATENT DOCUMENTS

| | | | |
|---|---|---|---|
| 7,228,404 B1* | 6/2007 | Patel ................... | G06F 9/30174 712/228 |
| 7,519,871 B2* | 4/2009 | Masser ............... | G06F 11/0793 714/47.1 |
| 7,877,642 B2* | 1/2011 | Ding ................... | G06F 11/3636 717/133 |
| 9,069,737 B1* | 6/2015 | Kimotho ............ | G06F 11/0793 |
| 10,067,815 B2* | 9/2018 | Chua ................... | G06F 11/0778 |
| 10,459,695 B2* | 10/2019 | Hauser ................ | G06F 11/3604 |
| 10,482,000 B2* | 11/2019 | Vikjord ................ | G06F 11/366 |

(Continued)

OTHER PUBLICATIONS

International Search Report and Written Opinion in PCT International Application No. PCT/US2019/052507, dated Dec. 16, 2019.

*Primary Examiner* — Douglas M Slachta
(74) *Attorney, Agent, or Firm* — Cognition IP, P.C.; Edward Steakley

(57) ABSTRACT

A system and method may provide assistance to programmer during programming to detect and predict the existence of errors in code and, in some aspects, predict fixes for erroneous code. In some aspects, the system and method may use artificial intelligence to learn based on edits made by programmers, by observing code changes that cause errors and code changes that fix errors, or based on other data.

7 Claims, 14 Drawing Sheets

(56) References Cited

U.S. PATENT DOCUMENTS

| | | | |
|---|---|---|---|
| 2006/0026467 A1* | 2/2006 | Nehab | G06F 11/008 714/38.1 |
| 2006/0143548 A1* | 6/2006 | DelRegno | H04M 3/301 714/48 |
| 2007/0168753 A1* | 7/2007 | Herter | G06Q 40/00 714/42 |
| 2009/0013208 A1* | 1/2009 | DiMuzio | G06F 9/4812 714/2 |
| 2010/0269091 A1* | 10/2010 | Barnes | G06F 11/366 717/106 |
| 2010/0325618 A1* | 12/2010 | Song | G06F 8/43 717/143 |
| 2011/0072418 A1* | 3/2011 | Kalamegham | G06F 11/3636 717/128 |
| 2013/0152047 A1* | 6/2013 | Moorthi | G06F 11/368 717/124 |
| 2014/0033174 A1* | 1/2014 | Farchi | G06F 11/3676 717/124 |
| 2015/0227838 A1* | 8/2015 | Wang | G06N 20/10 706/12 |
| 2015/0278074 A1* | 10/2015 | Carson | G06F 11/3624 714/38.11 |
| 2016/0306689 A1 | 10/2016 | Jain | |
| 2017/0039132 A1* | 2/2017 | Bates | G06F 11/3688 |
| 2017/0063910 A1 | 3/2017 | Muddu et al. | |
| 2018/0082183 A1 | 3/2018 | Hertz et al. | |
| 2018/0239658 A1* | 8/2018 | Whitner | G06F 11/3495 |
| 2018/0276562 A1* | 9/2018 | Woulfe | G06N 20/00 |
| 2019/0391904 A1* | 12/2019 | Sabharwal | G06F 11/3688 |

* cited by examiner

ERROR RECOVERY

CROSS-REFERENCE TO RELATED APPLICATIONS

This application claims the benefit of U.S. Provisional Patent Application No. 62/735,026 filed Sep. 22, 2018, which is hereby incorporated by reference in its entirety.

FIELD OF INVENTION

The present disclosure relates generally to methods and systems for error recovery during programming and development.

BACKGROUND

Computer programmers spend a large portion of their time debugging code and fixing errors. It is often time consuming for programmers to debug code, even when facing common-place errors. In the current state of the art, the programmer may have to research online or in a local codebase to determine the reasons for an error. It would be desirable to provide better tools to help programmers eliminate errors in their code.

SUMMARY

In some embodiments, a programming co-pilot system is provided that may integrate with a code editor. The programming co-pilot system may provide functionality such as error detection, error classification, error prediction, fix detection, fix prediction, training data generation, or community and team discussion of errors.

One embodiment relates to detection of errors in source code. A configuration request may be received to monitor one or more communication channels of a running computer program. The communication channels may be monitored and content of the communication channels may be parsed to identify an error. Error context of the error may be identified and stored. An error status of the error may be evaluated, and it may be determined whether the error was handled successfully or needs attention.

One embodiment relates to classifying errors into error types. A plurality of training examples may be provided, which may comprise error text, additional error content, and an error type label. One or more features may be extracted from the error text and error content, and a machine learning model may be trained based on the training examples. An unseen error text and error content may be provided and classified into an error type according to the machine learning model.

One embodiment relates to predicting whether a portion of code contains an error. A portion of source code may be provided and a plurality of features extracted from the source code. The features may be input into a machine learning model that has been trained on one or more labeled training examples, where the training examples comprise code portions and labels indicative of errors. The machine learning model may predict from the features the existence of an error and the type of error.

One embodiment relates to detecting fixes to source code during programming by a programmer. A code editor may monitor and store a first set of edits made to source code by a programmer. An error may be detected in the source code. A second set of edits may be made by the programmer and tracked. The source code may be run again and the error determined to no longer be present. The second set of edits made by the programmer, or a portion thereof, may be determined to be a fixing set of changes that fix the error.

One embodiment relates to predicting fixes to source code. A portion of source code may be provided, which contains an error. Moreover, error information may be provided about the error. The source code and error information may be input into a machine learning model, where the machine learning model has been trained on training examples of erroneous code portions and fixes to correct the corresponding code portions. The machine learning model may generate a predicted fix for the error in the source code.

One embodiment relates to generating artificial training examples for code portions having errors. An error-free code portion may be provided. The code portion may then be modified to introduce an error. A fix for the error may be determined using one of several methods. The erroneous code portion, the resulting error, and the fix for the error may be used as a training example for error detection, error prediction, fix prediction, or other methods.

One embodiment relates to presenting a useful user interface to a user to assist with fixing errors in code. The user interface may present a variety of information about an error to assist the user, including crowd-sourced information about the error, suggested fixes for the error, and mechanisms for sharing information from the user to others about the error and potential fixes.

BRIEF DESCRIPTION OF THE DRAWINGS

The present disclosure will become better understood from the detailed description and the drawings, wherein.

DETAILED DESCRIPTION

Figure 1:
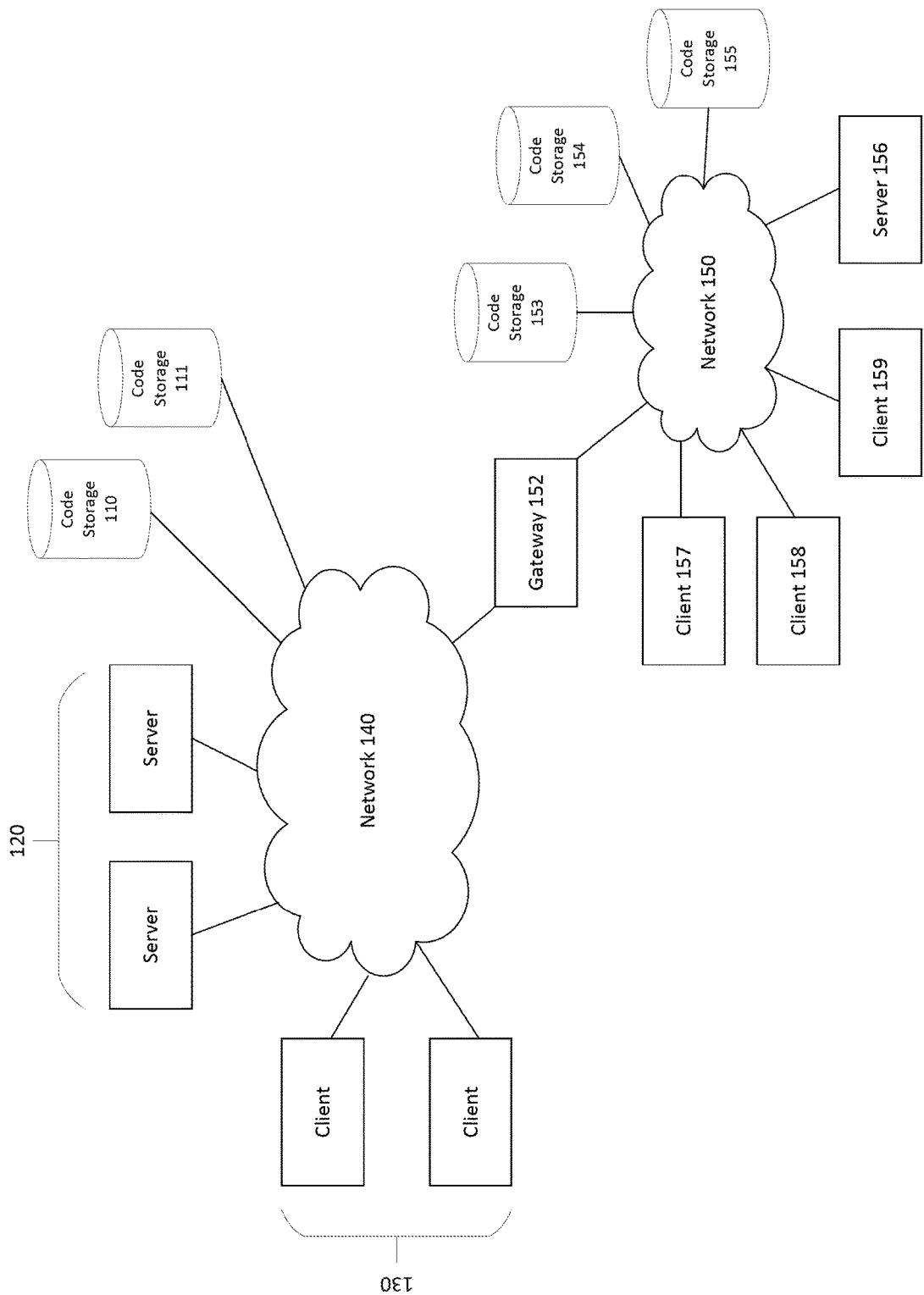
FIG. 1 illustrates an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code databases 110, 111 that store computer code, such as source code. Some external code databases 110, 111 may be globally accessible to any entity on the network 140. Other external code databases 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprise a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, a code storage comprises a database. A database is any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understand that where the terms server, client, or computer system are used, this includes the use of networked arrangements of multiple devices operating as a server, client, or computer system. For example, distributed or parallel computing may be used.

Figure 2A:
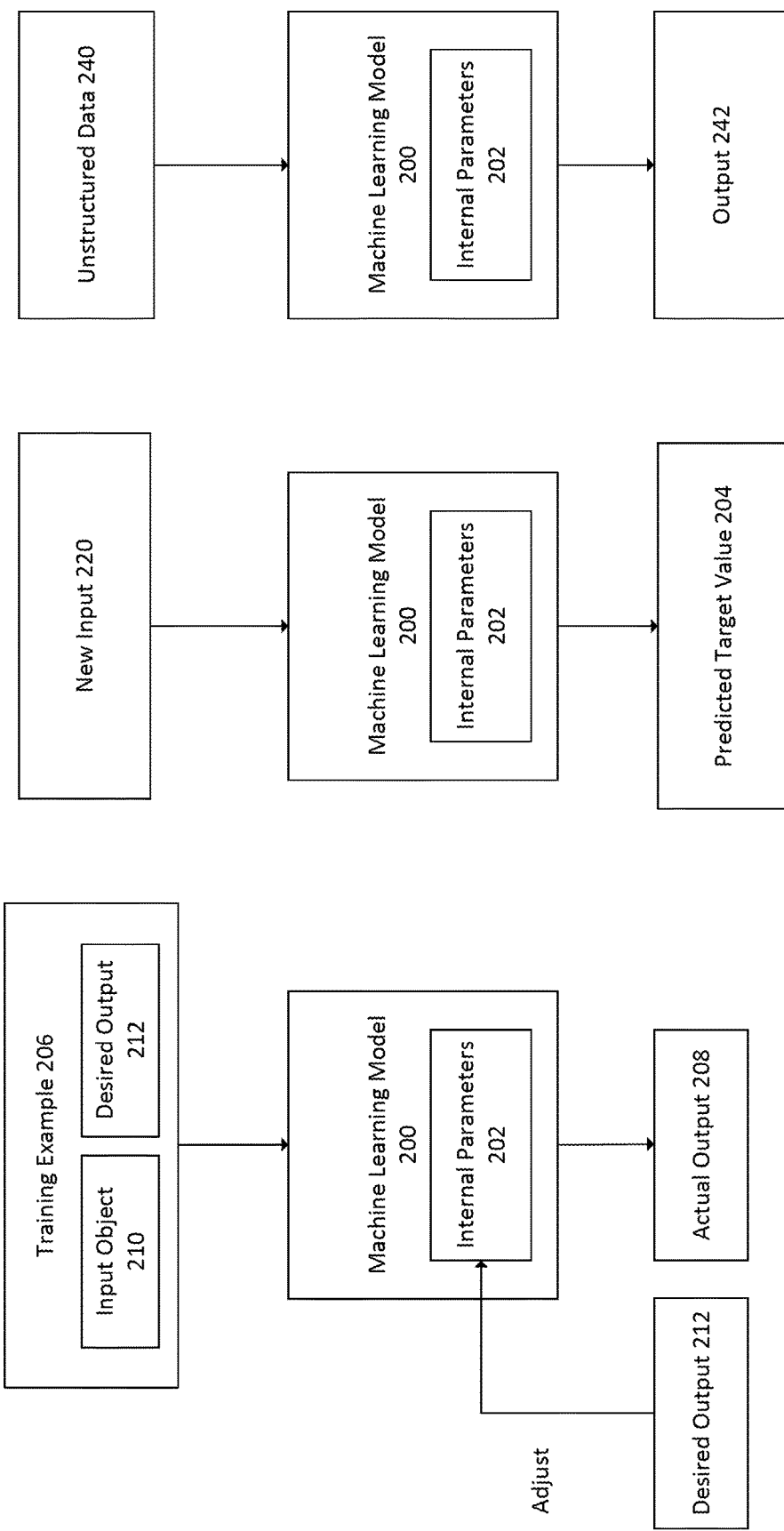
FIG. 2A illustrates an exemplary machine learning model that may be used in an embodiment.

FIG. 2A illustrates an exemplary machine learning model 200. A machine learning model 200 may be a component, module, computer program, system, or algorithm. Some embodiments herein use machine learning for code completion or predictive editing. Machine learning model 200 may be used as the model to power those embodiments described herein. Machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

Figure 2B:
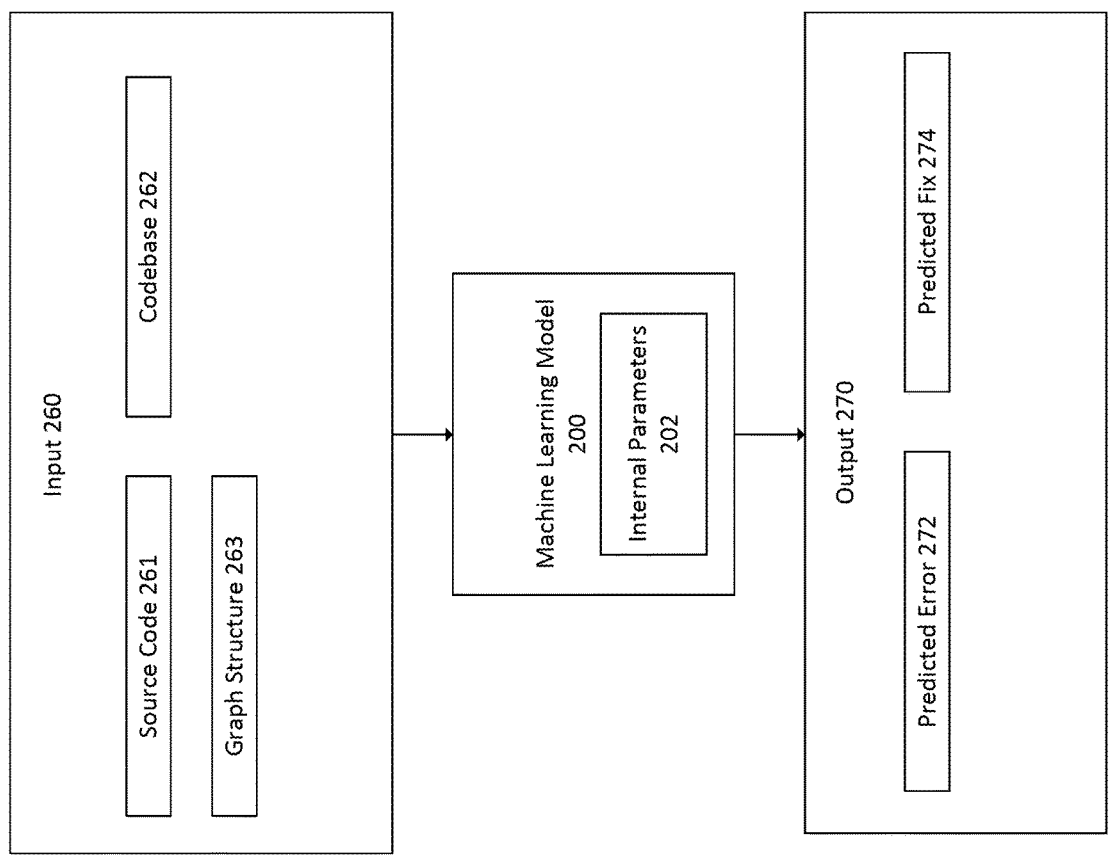
FIG. 2B illustrates an exemplary machine learning model that may be used in an embodiment.

FIG. 2B illustrates use of the machine learning model 200 to perform inference on input 260 comprising data relevant to a programming co-pilot system 340. Input 260 may comprise any of source code 261, codebase 262, graph structure 263 representation of code, or other data. The machine learning model 200 performs inference on the data based on its internal parameters 202 that are learned through training. The machine learning model 200 generates an output 270 comprising information or data relevant to helping a programmer, such as predicted error 272, predicted fix 274, or other data.

Figure 3:
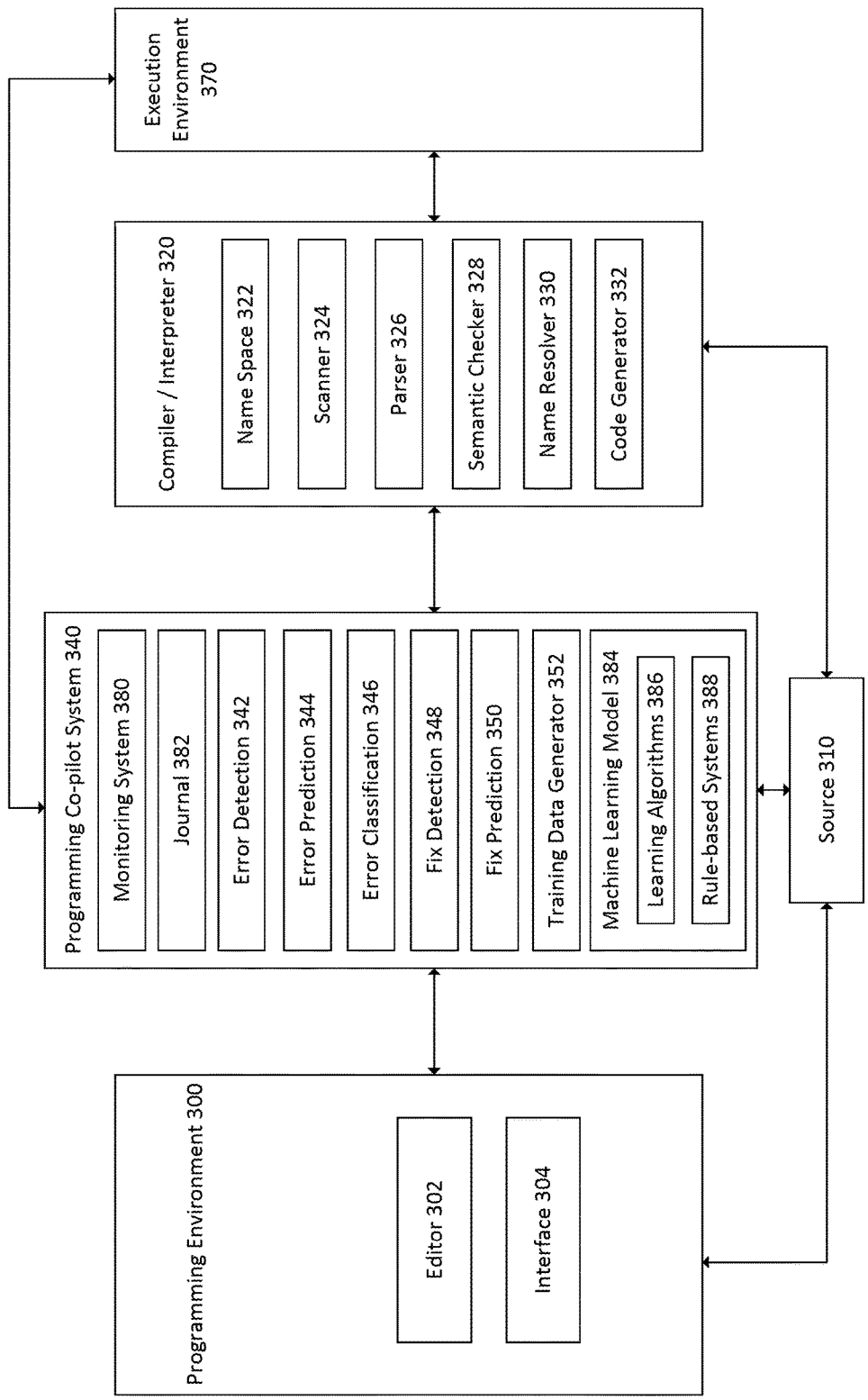
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programming. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell or operating command line such as the Bash command line is used as an environment for programming and may comprise an editor 302. In still other embodiments, single input interactive environments, such as Read-Eval-Print Loop (REPL), may be used as the editor 302.

A compiler or interpreter 320 may compile the code 310 into executable instructions or an intermediate representation, or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language.

In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, source code 310, and compiler/interpreter 320 to provide programming assistance to the programmer. Programming co-pilot 340 may include a monitoring system 380 to monitor user actions in an editor 302 and system events such as inputs, outputs, and errors. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot may include functionalities such as error detection system 342, error prediction system 344, error classification system 346, fix detection system 348, fix prediction system 350, training data generator 352, and other features. Programming co-pilot 340 may include machine learning model 384 to power its functionality, including learning algorithms 386 that learn from data or rule-based systems 388 that use hard-coded rules or heuristics. Although illustrated as one unit, multiple machine learning models 384 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot system 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages, and other code. For example, source code may be Python, Perl, PHP, Javascript, Java, C, C++, HTML, reStructuredText, Markdown, CSS, shell scripts (such as bash, zsh, etc.), and so on.

A. Error Detection

In an embodiment, the programming co-pilot system 340 includes an error detection system 342. The error detection system 342 may monitor the programming environment 300, the compiler 320, and execution environment 370, identify when errors are reported, record error messages and context such as the portion of the source code 310 which is likely to have created and the error or the state of the computer program at the time of the error, and identify whether the error is properly handled or requires attention. Errors may include syntax errors such as misspelling or incorrect sequencing of tokens, semantic errors such as type mismatch or calling variables out of scope, execution errors such as index out of bounds or out of memory, logic errors such as providing the wrong output for a test case or running an infinite loop, or other errors. Errors may be identified at compile time during compilation of the code by the compiler 320, at run time during execution of compiled code, or at test time when execution results are compared against default values or user defined test cases.

Figure 4:
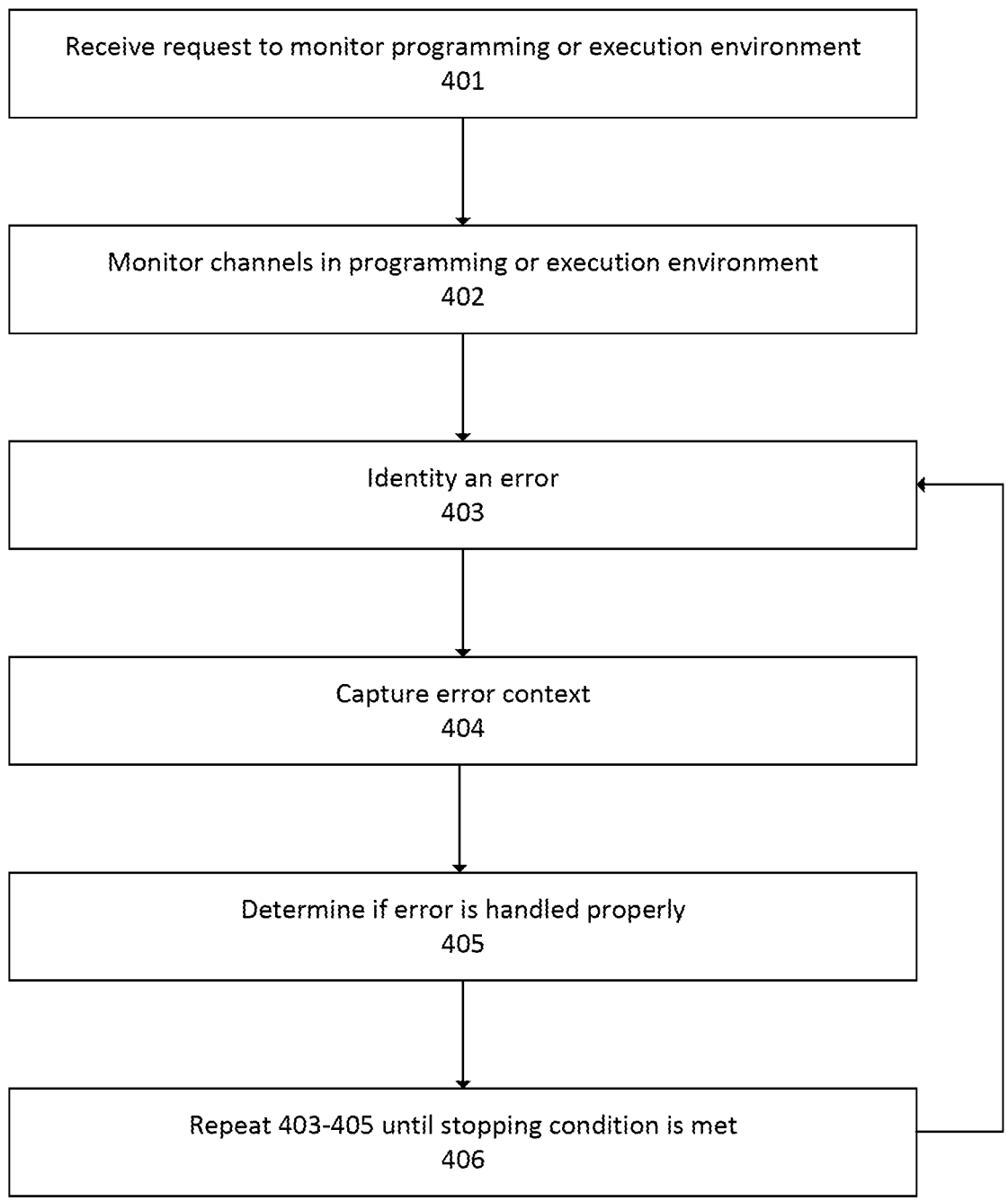
FIG. 4 illustrates an exemplary method for implementing error detection.

FIG. 4 illustrates an exemplary method 400 of implementing error detection. In step 401, a configuration request is received for the error detection system 342 to monitor a programming environment 300, compiler/interpreter 320, or execution environment 370 where code is executed. The configuration request may specify one or more communication channels to be monitored for potential error events. A communication channel may comprise a stream such as standard output or standard error, a local log file or remote server log file, a mechanism for viewing program execution state such as an application profiler, thread dump, heap dump, or stack trace, or another communication channel. In some embodiments, the configuration request may be automatically generated by the programming environment upon launch or other trigger. In other embodiments, the configuration request may be created by a user, such as in response to selection of a configuration option by the user. In an embodiment, input is received from a user on an options screen to determine a communication channel to monitor. In other embodiments, the programming co-pilot system 340 may initiate a configuration request to monitor the one or more communication channels during or after installation. In an embodiment, the programming co-pilot system 340 installs and triggers monitoring system 380 during or after installation of co-pilot 340, where the monitoring system 380 may monitor the communication channels. In step 402, the communication channels specified by the configuration request are monitored. Optionally, the error detection system 342 may monitor additional communication channels based on default values or global configuration settings. In some embodiments, the communication channels are monitored live, where each new message is received, captured, and evaluated in real-time. In other embodiments, the communication channels are received in full after processing, where the entire content of the communication channels are available for evaluation. The error detection system 342 may replay the content of the communication channels message by message or review the entire contents together. In step 403, the communication channels are parsed to identify an error. In an embodiment, error identification may be performed by rule-based heuristics. For example, errors may be identified by using regular expressions which match common error strings known to be used by programming languages in the programming environment. In an embodiment, error identification may be performed by a machine learning model using a learning algorithm. For example, a RNN, CNN, or other machine learning algorithm capable of reading sequence data may be applied to the communication channels and trained to identify messages that indicate errors. In some embodiments, rule-based heuristics and machine learning models using learning algorithms may be combined. For example, some errors may be identified using rule-based heuristics while others are identified using learning algorithms, or rule-based heuristics and learning algorithms may be ensembled, by combining multiple models into an ensemble machine learning model, such that an error is identified when one or both flag an error. In other embodiments, error detection may be performed without the need to parse and analyze text with a machine learning model. The monitoring system may directly connect to the execution environment 370 and receive error content that directly identifies the error. For example, the error content may be an error thrown by an error or exception handling system. In other embodiments, the error content may be an error code, such as a program return code. In some embodiments, the error content contains an unambiguous identifier of a specific error, such that textual parsing is not required. In step 404, error context is captured. Error context may include excerpts of the communication channels identifying the error, configuration settings in the programming environment, program execution state or stack trace at the time of the error, excerpts of code to which the error is attributed, or other information related to an error. Error context may be captured through rule-based heuristics, machine learning model-based learning algorithms, or a combination of the two. In some embodiments, capturing of the error context may be performed without the need to parse and analyze the text with a machine learning model. The monitoring system may directly connect to the execution environment 370 and receive error context. For example, the error context may be a stack trace that is directly provided by the execution environment 370, such as by a thrown error or exception. In an embodiment, rule-based heuristics may be used to capture or exclude a number of messages in the communication channels before or after the identified error depending on what type of error was identified. In an embodiment, a machine learning model may be trained to predict which portion of the code the error should be attributed to. In step 405, error status is evaluated as being handled successfully or needing attention. Error status may be evaluated through rule-based heuristics, machine learning models using learning algorithms, or a combination of the two. In an embodiment, rule-based heuristics may be used to evaluate error status by searching for keywords or evaluating how long the program continues to execute after an error is identified. In an embodiment, a machine learning model may be trained to predict error status based on error context captured in step 404. In some embodiments, detecting the error status may be performed without the need to parse and analyze text with a machine learning model. The monitoring system may directly connect to the execution environment 370 and receive error status from the environment. For example, the error status may be returned in a thrown exception or error or program return code. In step 406, steps 403-405 may be repeated until program execution is complete or a stopping condition is reached.

B. Error Classification

In an embodiment, the programming co-pilot system includes an error classification system 346. The error classification system 346 may take an error indication as input and may predict one or more error types to which the error indication may belong. In some embodiments, the error indication may be an error message returned by the programming environment 300, execution environment 370, or the compiler 320, such as the error message identified in step 403. In some embodiments, the error indication may include additional information such as the error context captured by the error detection system 342 in step 404. The error types to be predicted may be defined by a user, defined by configuration settings, or automatically clustered by the error classification system 346.

Figure 5:
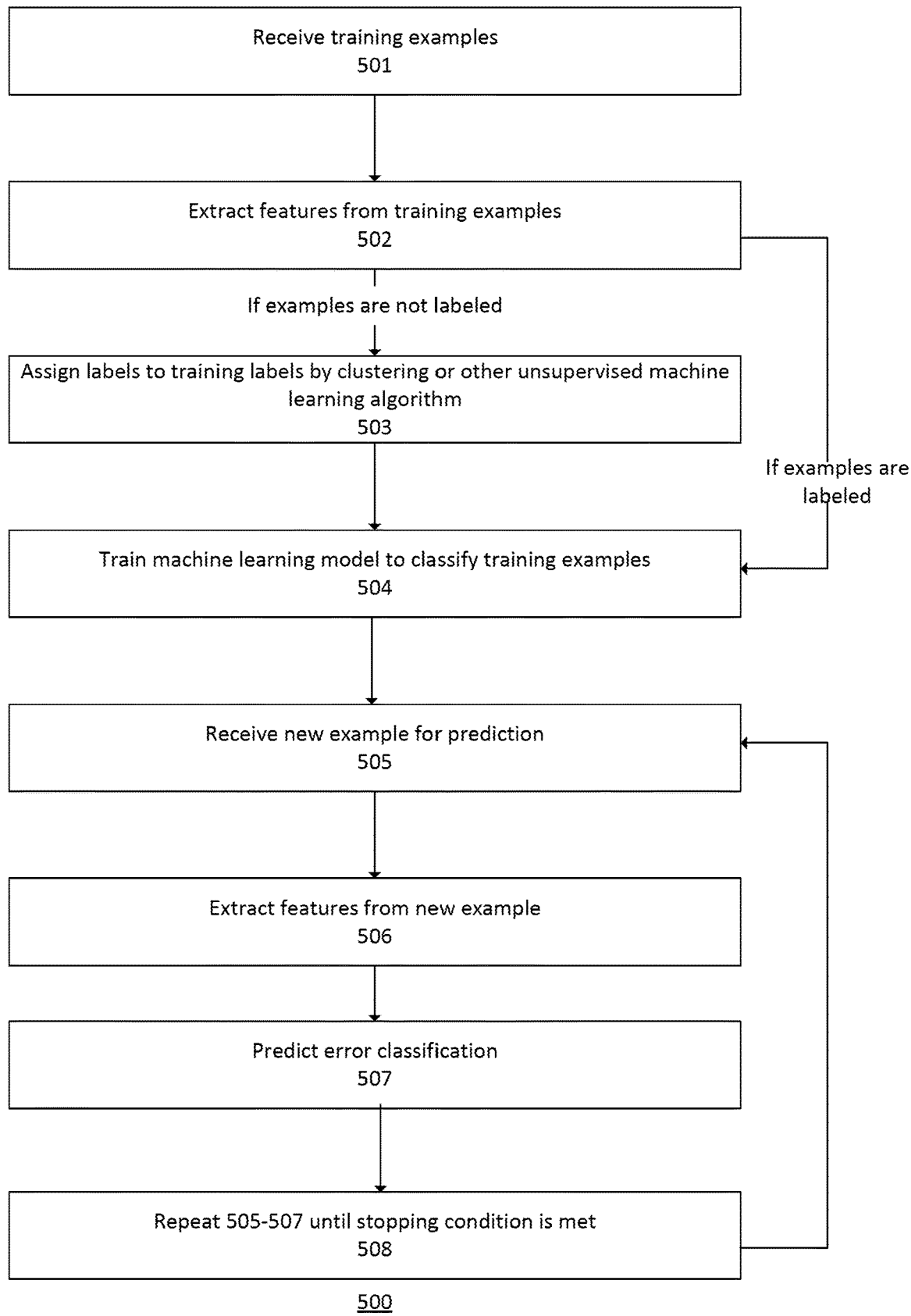
FIG. 5 illustrates an exemplary method for implementing error prediction.

FIG. 5. illustrates an exemplary method 500 for performing error classification. In step 501, the error classification system 346 receives a plurality of training examples. Each training example may include an error indication, additional error content, and may optionally include an error type label for the error indication. The error indication and error type label may, for example, be text. Additional error content may be textual or non-textual, such as a stack trace or other configuration information identifying the state of the program or system. In step 502, the error classification system 346 may extract one or more features from the training examples. In some embodiments, features may comprise statistics computed on the count and order of words or characters in the error indications of the training examples. For example, a bag-of-words vector may be extracted as a feature wherein each position in the bag-of-words vector corresponds to a distinct word, and the value at each position is the number of times the corresponding word occurs in the error indication. In another example, a bag-of-characters vector may be extracted as a feature wherein each position in the bag-of-characters vector corresponds to a distinct character, and the value at each position is the number of times the corresponding character occurs in the error indication. In another example, an algorithm such as Latent Dirichlet Allocation or Latent Semantic Indexing may be applied to the words in the error indication to extract a numerical feature vector representing the distribution of topics in the error indication. In some embodiments, the sequence of words in the error indication may be used as features directly. In another example, the relative position and distance between tokens in the code may be used as the features. In step 503, optionally when training examples do not include error type labels, the error classification system 346 may automatically group training examples and assign each group a distinct error type label. The assigned error type labels may be ascending numbers, randomly generated identifiers, keywords extracted from the training examples in the group, or other distinct labels. In some embodiments, training examples may be grouped by using a clustering algorithm on the features extracted in step 502. For example, clustering algorithms such as Affinity Propagation, K-means, DBCAN, Spectral Clustering, or other cluster algorithm may be used. In some embodiments, training examples may be grouped by comparing error indication text from each training example. For example, training examples may be compared for similarity using text similarity metrics such as edit distance, Jaccard distance, or other metrics. Training examples with similarity scores above a threshold value may be grouped together. Rule-based heuristics may be used to combine or separate groups when a training example has similarity score above the threshold value with some members of the group but below the threshold with other members of the group. In step 504, the error classification system 346 trains one or more machine learning models to predict an error type label for the training examples given the features extracted in step 502. In an embodiment, the machine learning model may be trained by presenting the features for one training example, generating a prediction, and adjusting the training model parameters to increase the probability of predicting the correct error type label and decrease the probability of predicting other error type labels. In an embodiment, a single multi-class classification machine learning model is used to predict the most likely error type label. In an embodiment, a plurality of machine learning models are used, wherein each machine learning model predicts the likelihood that one error type label is correct, and the error type label with the highest predicted likelihood is returned. In step 505, the error classification system 346 receives a new error indication for prediction. In step 506, the error classification system 346 may extract one or more features from the new error indication, mirroring the features extracted in step 502. In step 507, the error classification system 346 applies the machine learning model trained in step 504 to the features extracted in step 506 and returns the resulting prediction of an error classification. In step 508, steps 505-507 may be repeated for new queries until a stopping condition is reached.

C. Error Prediction

In an embodiment, the programming co-pilot system includes an error prediction system 344. The error prediction system 344 may take a portion of code as input and predict the likelihood that an error may occur. In addition, some or all of the codebase that contains the portion of code may be input to the error prediction system 344. The codebase as a whole may be used in the prediction process. In some embodiments, the error prediction system 344 may also predict one or more types of error that may occur. In an embodiment, the error types to be predicted comprise the same error types which may be identified through classification by the error classification system 346 in method 500. In some embodiments, the error prediction system 344 may also assign a confidence interval to its predictions. Moreover, the error prediction system 344 may also predict a location in the code portion that is causing the error, such as by identifying line numbers or positions.

Figure 6:
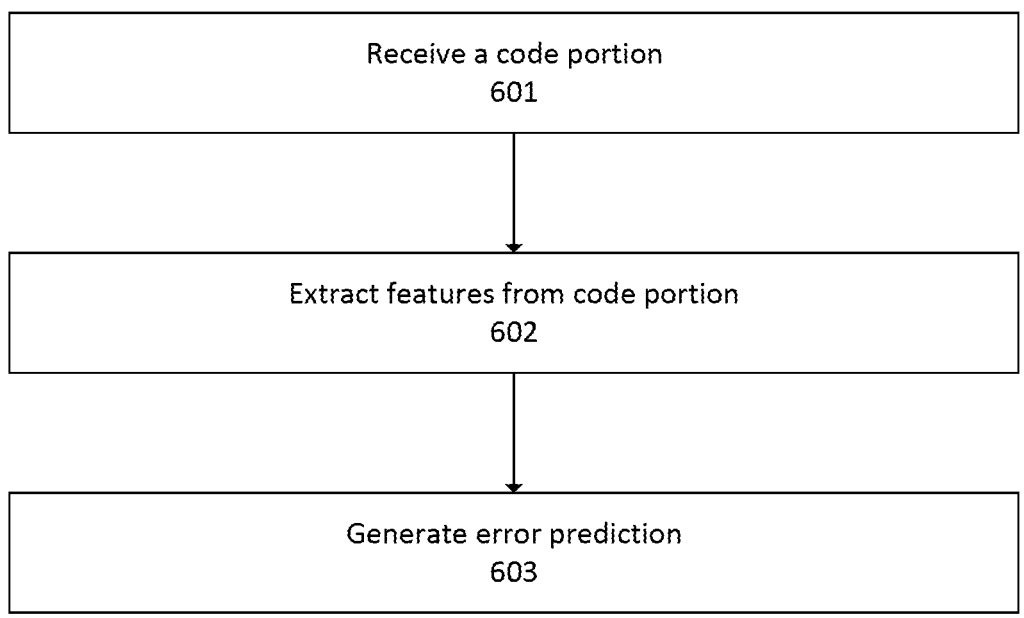
FIG. 6 illustrates an exemplary method for performing error classification.

FIG. 6 illustrates an exemplary method 600 of implementing error prediction. In step 601, a code portion is received. The code portion may comprise a few lines of code, a class or method definition, an entire file, an entire project of multiple related files, or other code portions. For example, the code portion may be code that is selected and submitted by a user, automatically submitted by a component in the programming environment, or extracted for prediction by the programming co-pilot system. In step 602, the code portion is pre-processed to extract features for prediction. Features may include count, order, and identity of tokens, variables, function names in the code, identifiers, symbols, and other features. For example, a bag-of-words vector may be extracted as a feature where each position in the vector corresponds to a distinct token or name, and the value at each position is the number of times the corresponding token or name occurs in the code portion. In another example, a dictionary of variables may be extracted that tracks where each variable is first initialized and where each variable is used. The dictionary of variables may be used to calculate statistical features such as minimum, maximum, or average distance between initialization and use of each variable. In another example, the sequence of tokens in the code may be used as the features. In another example, the relative position and distance between tokens in the code may be used as the features. In another embodiment, the code portion may be translated into a graph structure comprising nodes and edges, which represents the code portion. Nodes and edges may represents tokens or code entities and their relationships to each other. Examples of graph structures that may be used include an abstract syntax tree or data flow diagram. The graph structure and its features, such as nodes, connections, and other aspects of the graph, may be used as features for prediction. In step 603, an error prediction is generated. In some embodiments, the error prediction may comprise a probability that an error will occur and an identification of the type of the likely error. One or more errors may be predicted by the error prediction system and an identification of type may be performed for each error. A likelihood of error may be generated for each type of error. For example, an error prediction may be that there is a "97% chance this line of code throws an IndexOutOfBoundsException." In some embodiments, the prediction may be generated by inputting features extracted in step 602 into one or more machine learning models. The machine learning models may be trained using a plurality of training examples comprising code labeled with an actual result of an error type or no error. In an embodiment, the training examples may be sourced from a code database containing code extracted from a crowd-sourced website or code database such as code storage 153, a team code database such as code storage 154, or an individual code database such as code storage 155. In an embodiment, at least a portion of the training examples may be automatically generated by a system such as training data generator 352. In an embodiment, the training examples may be aggregated from a combination of sources. In an embodiment, the actual result labels may be provided in the code database or be determined by compiling and executing the code. Each training example may be pre-processed to extract a plurality of features as described in step 602. The machine learning models may be presented with the features from each training example to yield a prediction. The prediction may be compared to the actual result, and parameters of the machine learning models may be adjusted to produce predictions more like the actual result given the features. In one embodiment, a single multi-class classification machine learning model may be used which predicts a single, most likely error type. Optionally, no error may be predicted if the probability falls below a threshold value. Optionally, a no error type may be included as a possible prediction. In one embodiment, a plurality of machine learning models may be used, wherein each machine learning model predicts the likelihood of one error type. The error type with the highest likelihood may be used as the prediction, or all error types with likelihood above a threshold value may be returned as predictions. In one embodiment, a machine learning model is used to predict an embedding vector which captures the semantic meaning and syntactic structure of the code portion. The embedding vector is compared to a library of embedding vectors predicted from other code portions to calculate similarity scores, and zero or more of the error types present in the other code portions that are most similar are used as the prediction for the code portion. In some embodiments, additional predictions may be returned for one or more subsets of lines of the code portion. The additional predictions may be generated by extracting features from the subsets of lines and applying a machine learning model with the same or different parameters to the features extracted from the subsets of lines. The length and frequency of subsets may be specified by the user, configuration settings, or default values.

D. Fix Detection

In an embodiment, the programming co-pilot system includes a fix detection system 348. The fix detection system tracks edits to the code, monitors for errors, and records further edits to the code which are associated with fixing the errors.

Figure 7:
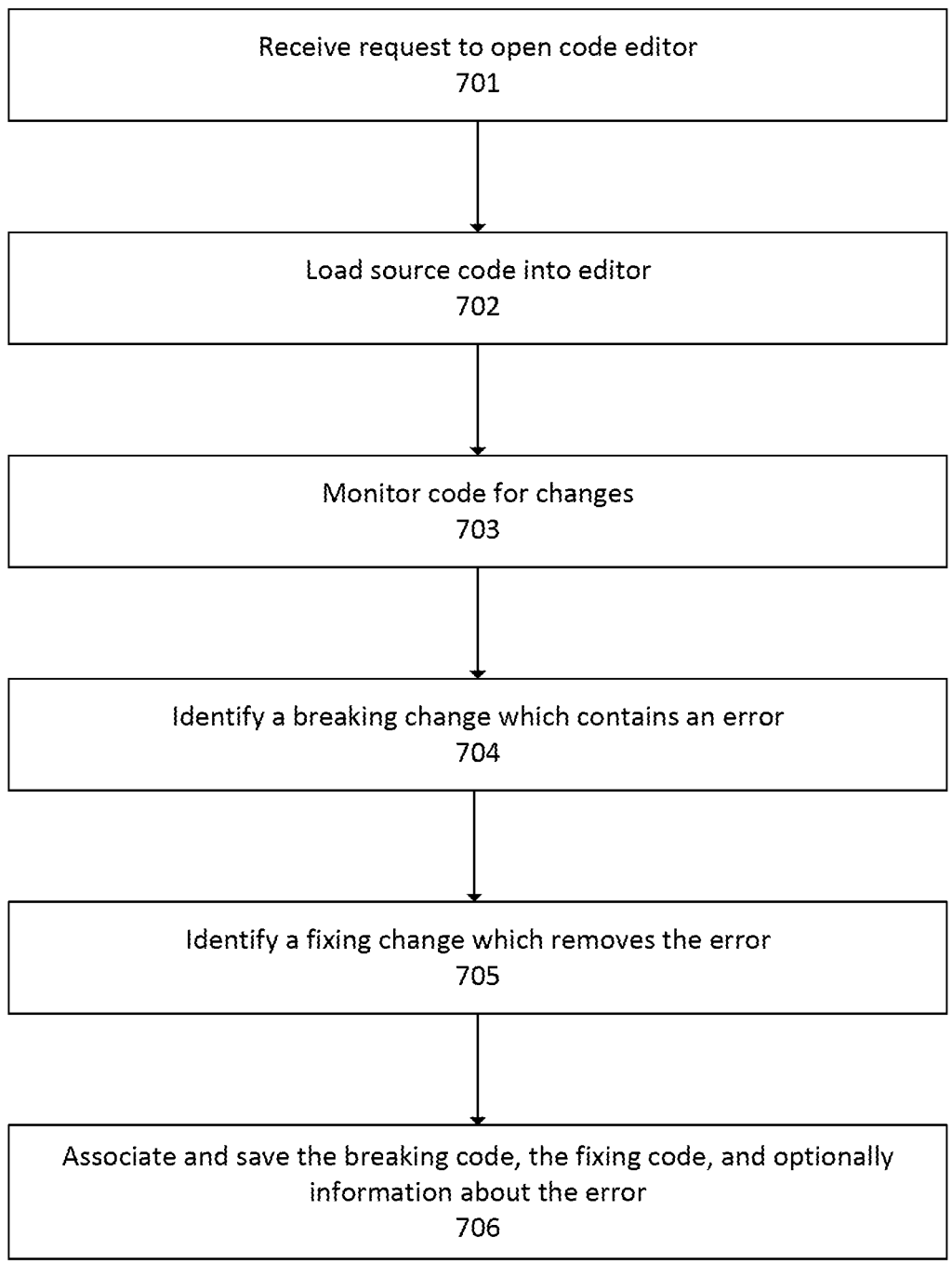
FIG. 7 illustrates an exemplary method for performing fix detection.

FIG. 7. illustrates an exemplary method 700 for performing fix detection. In step 701, a request is received from a user to open a code editor and the editor is launched. In step 702, a source code file is loaded into the code editor. In step 703, the fix detection system 348 monitors the code for changes. In some embodiments, monitoring is achieved by recording each keystroke in the text editor. In some embodiments, monitoring is achieved by scanning the text periodically and comparing differences between a current scan and a previous scan. For example, scanning may occur at fixed intervals. In another example, scanning may occur based on direct or indirect prompts from the user. Direct prompts may comprise actions such as entering a whitespace character, starting a new line, pressing a button, saving the file, compiling the code, executing the code, or other action. Indirect prompts may comprise actions such as pausing for at least a threshold number of seconds between edits. In step 704, a breaking change comprising a change which creates an error in the code is identified, and a first copy of the code is recorded. For example, a change may be identified as a breaking change by detecting that the program throws an error when the program is executed after the change. This error may be detected, for example, by monitoring the execution environment 370 as described above. For example, during the running of the program the monitoring system 380 may detect a thrown error, exception, or error code. The monitoring system may capture an error message and additional error content, such as described in the context of step 404. The first copy of the code may comprise the current code after the breaking change or an earlier version. In an embodiment, a machine learning model may be trained to attribute the error in the code to the breaking change or a previous change. In an embodiment, the breaking change is identified by applying the error prediction system 344 to each change in the code to evaluate if any errors have been introduced. Optionally, a copy of additional error information returned by the error prediction system such as type of error predicted, confidence intervals, or specific lines of code which produce errors may also be recorded. In an embodiment, the breaking change is identified by compiling or executing the code to check if an error is returned. In an embodiment, a subset of errors may be ignored and not considered to create a breaking change. For example, errors may be attributed to an incomplete word, token or logical statement which the user is still typing may be ignored. In step 705, a fixing change comprising a change which removes the error created by the breaking change is identified, and a second copy of the code is recorded. For example, a change may be identified as a fixing change by detecting that the error no longer occurs when the program is executed after the change. The lack of an error may be determined by running the code and monitoring the execution environment. The lack of an exception or error being thrown may indicate a correct execution. Moreover, the return code may also be monitored to determined that a code indicating success is returned. In other embodiments, communication channels such as error logs or server logs may be parsed and analyzed using a machine learning model, such as a learning algorithm or rule-based system, to determine if any text in the communication channel indicates an error. Moreover, any of the methods for error detection described above, such as in steps 402, 403, and 404 may be used. The second copy of the code may comprise the current code after the fixing change or an earlier version. In an embodiment, a machine learning model may be trained to attribute the removal of the error to the fixing change or a previous change. In an embodiment, the difference between the first and second copy of the code may be obtained by continuously tracking edits made to the code by the programmer. In other embodiments, the difference between the first and second copy of the code may be obtained by performing a diff of the two copies of code. The difference between the first and second copy of the code is likely to capture changes which are responsible for fixing the error in the first copy of the code. In an embodiment, the fixing change is identified by applying the error prediction system 344 to each change in the code to evaluate if the error has been removed. In an embodiment, the fixing change is identified by iteratively compiling the code or executing it after each edit made by the programmer. A series of edits of the programmer may be identified from electronic data in the journal 382 and applied in steps, with compilation or execution occurring after each step. The first edit of the programmer that causes the code to compile and run correctly without error may be identified as the fixing change. In step 706, the first copy of the code and the second copy of the code are saved. Optionally, the copy of additional error information may also be saved. The first copy of the code, having the error, and the second copy of the code, without the error, may be associated together along with the copy of additional error information.

In an embodiment, further methods may be used to identify a change that fixed the error in the code. In the course of receiving edits from a user, there may be many edits that are made between two versions of code, and it would be desirable to isolate the edit that causes an error to be resolved. As described above, a first copy of code having an error and a second copy of code not having the error may be identified based on compiling and running the code. However, there may be multiple changes between the first copy of code and second copy of code. A method of identifying the change between the first copy of code and second copy of code that fixed the error may be performed automatically or manually.

In one embodiment, the change that fixed the code may be identified automatically. A data set of examples of code where the error was resolved may be stored. These code examples may be analyzed using heuristics, machine learning, or statistical methods to identify common changes that were made to each of these examples. The common changes may be likely to be the relevant portion of code that resolved the error. Changes made in these code examples that are not common between the code examples may be more likely to not be the portions of code that resolved the error and may be ignored, in some embodiments.

In one embodiment, the change that fixed the code may be identified with user interface elements for manual input. In one embodiment, one or more user interface components may be displayed to the user for identifying which one of a plurality of changes to code was the one that fixed the error. In some embodiments, the user interface components may be selectors or menus. In other embodiments, the user interface components may allow entering an identifier of the code that fixed the error.

In one embodiment, the error prediction system 344 includes an option for users who are fixing their code to anonymize their fix for sharing. If the option is selected, the error prediction system 344 may automatically remove private information from the source code, or a portion thereof, that are not required for the fix. Using a share option, the fix, including the source code or a portion thereof, may be shared with other users such as in a community or discussion board. Private information that may be removed or changed may include, for example, variable or function names, removal of portions of code, changing or redacting of portions of code, and so on.

In one embodiment, the error prediction system 344 prompts the user to enter a written explanation of the fix. The written explanation may be stored with the text. It may be shared in an online community or discussion board. It may also be stored for further reference by the user.

E. Fix Prediction

In an embodiment, the programming co-pilot system includes a fix prediction system 350. The fix prediction system may take a code sample and optionally additional error information as input and provide a user with one or more options to fix errors in the code sample.

Figure 8:
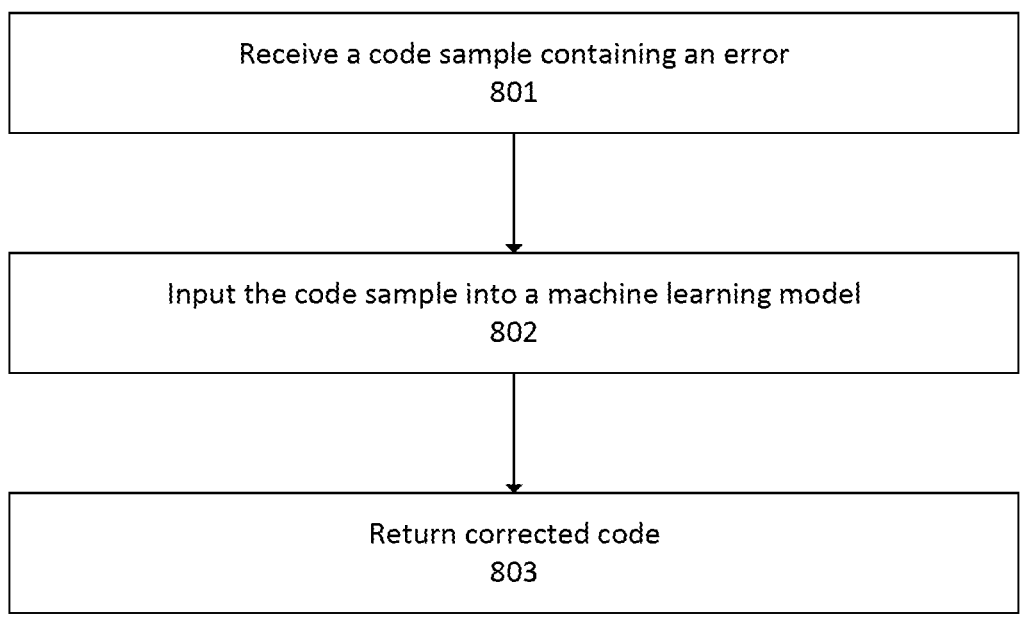
FIG. 8 illustrates an exemplary method for performing fix prediction.

FIG. 8 illustrates an exemplary method 800 for performing fix prediction. In step 801, the fix prediction system receives a code sample containing an error. The code sample may comprise a line of code, a logical statement, a class or method definition, a file, or a project containing multiple related files. Optionally, additional error information comprising one or more of an error message, a configuration file for the programming environment, a stack trace, a thread dump, a heap dump, or other information related to the error may be received. In an embodiment, the code sample is sent by the error detection system 342 upon an error being detected. Optionally, the additional error information may comprise the error context captured by the error detection system 342 in step 404. In an embodiment, the code sample is sent by the error prediction system 344 upon an error being predicted. Optionally, the additional error information may comprise the one or more error types predicted by the error prediction system 344. In step 802, the code sample and optionally the additional error information are input to a machine learning model which has been trained to output a prediction for how to correct the code to fix the error. In an embodiment, the machine learning model is a sequence to sequence model comprising a first encoder model and a decoder model. The first encoder may comprise a RNN, CNN, or another machine learning model capable of accepting sequence input. The decoder may comprise a RNN, CNN, or another machine learning model capable of generating sequence output. The sequence to sequence model may be trained on training examples, wherein each training example comprises a training code sample, the error associated with the sample and a corresponding training corrected code. The sequence to sequence model may be trained by inputting the training code sample to the first encoder model to create a first embedding vector. The first embedding vector may be input to the decoder model to create a code output result. The code output result may be compared to the training corrected code, and the parameters of the first encoder and the decoder may be adjusted to reduce the difference between the code output result and the training corrected code. The parameters may be adjusted through backpropagation. In an embodiment, the sequence to sequence model may include a second encoder which takes in the additional error information to create a second embedding vector. The first embedding vector may be combined with the second embedding vector as input to the decoder. For example, the first and second embedding vectors may be combined using concatenation, addition, multiplication, or another function. In an embodiment, the decoder may take additional inputs comprising one or more features extracted from the additional error information. For example, the features may comprise the error type of the error in the code sample. In another example, the features may comprise statistics computed on the count and order of words or characters in the additional error information. In an embodiment, the machine learning model for outputting a prediction for how to correct the code to fix the error may be an unsupervised model. The unsupervised model is not trained and instead identifies its predictions based on identification of patterns in the data. In an embodiment, the unsupervised machine learning model may identify common features or code portions in other code in the codebase or other data sets. The unsupervised machine learning model may return a higher likelihood of correctness for source code portions that are common or have features in common with other code in the codebase or other data sets. Thus, the unsupervised machine learning model may predict fixes to source code without requiring training data. In step 803, a fix suggestion is returned. In an embodiment, the fix suggestion comprises the corrected code. In an embodiment, the fix suggestion comprises the code sample with markup illustrating changes required to convert the code sample to the corrected code. In an embodiment, the fix suggestion includes a natural language summary describing the changes in the corrected code. For example, the natural language summary may be generated by a machine learning model. A sequence to sequence model may be trained where an encoder creates an embedding based on the sequence of changes in the corrected code, and the decoder generates a natural language summary. In another example, the natural language summary may be selected from a library using rules-based heuristics. Selection heuristics may consider factors such as the number of changes made, the number of characters changed, or the type of error corrected.

F. Artificial Training Data Generation

In an embodiment, the programming co-pilot system may include a training data generator 352. The training data generator may create additional training examples comprising corresponding sets of code samples with errors, additional error information, and corrected code.

Figure 9:
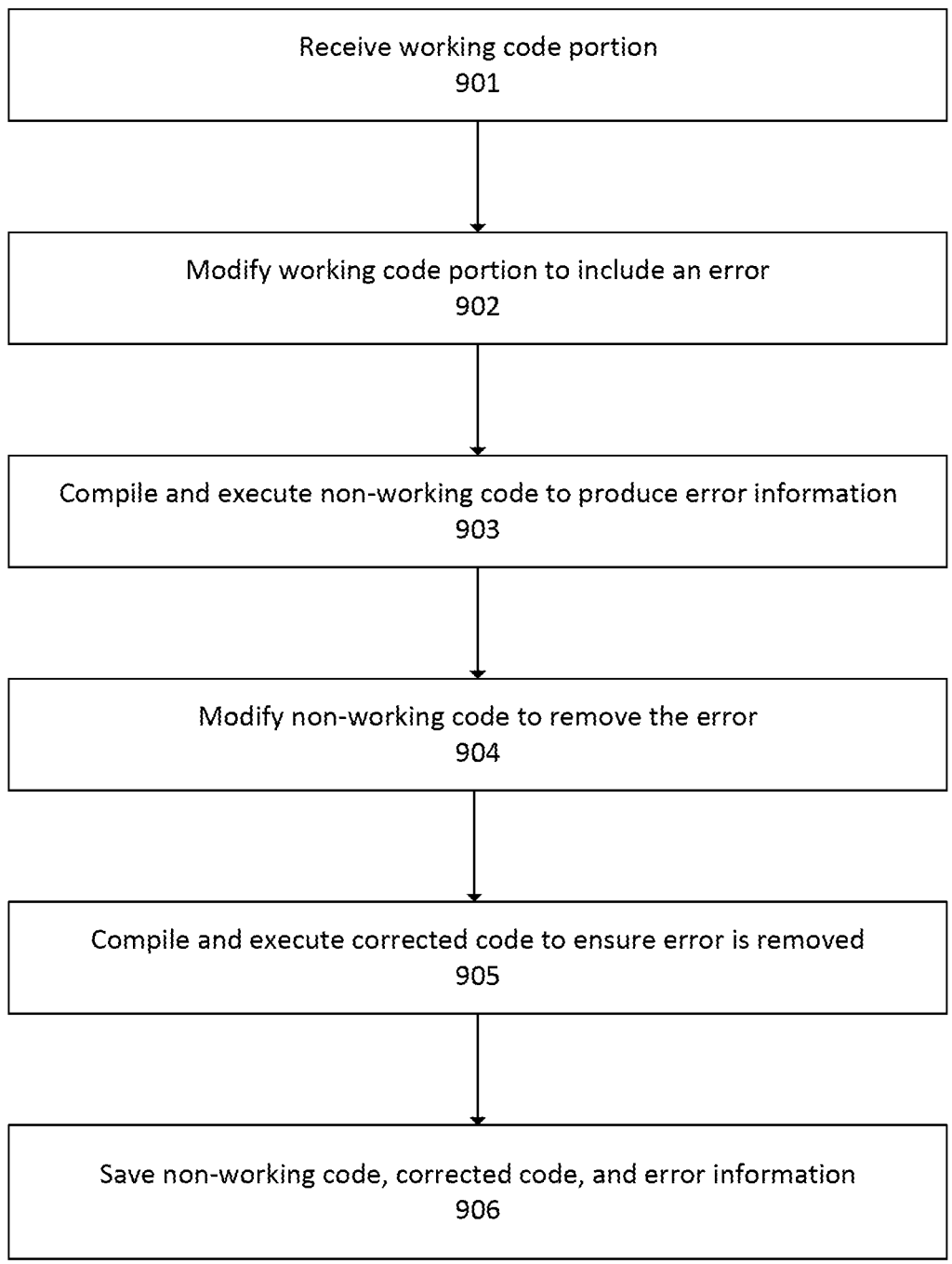
FIG. 9 illustrates an exemplary method for artificial training data generation.

FIG. 9 illustrates an exemplary method for performing training data generation. In step 901, a working code portion without errors is received. In step 902, one or more changes may be applied to the working code portion to create a non-working code portion which includes an error. For example, the working code portion may be changed by adding, deleting, modifying, or swapping position of characters or tokens. The changes may be random, pseudo-random, arbitrary, or based on rule-based heuristics, such that the code is broken and leads to errors. In step 903, the non-working code portion is compiled or executed to generate an error message and additional error content. In step 904, one or more changes may be applied to the non-working code portion to create a fixed code portion which removes the error. For example, the original changes may be reverted in part or entirely, further changes may be made randomly or based on rule-based heuristics, or a machine learning model using a learning algorithm may be used to predict changes to correct the error. In an embodiment, the machine learning model may comprise the fix prediction system 350. In one embodiment, adversarial learning may be used, such as a generative adversarial network (GAN), which may comprise two neural networks. In such an embodiment, a first neural network may be trained to produce broken code that looks like correct code and a second neural network may be trained to distinguish between broken and unbroken code or to fix broken code. In step 905, optionally, the fixed code portion is compiled or executed to ensure the error was removed. If the error was not removed, step 904 may be repeated or all data may be discarded. In step 906, the non-working code portion, the error message, and the fixed code portion are saved. The artificially generated training data, including the non-working code portion, error message, and fixed code portion may be stored for use as training data for error classification, error prediction, and fix prediction.

G. User Interface

Figure 10A:
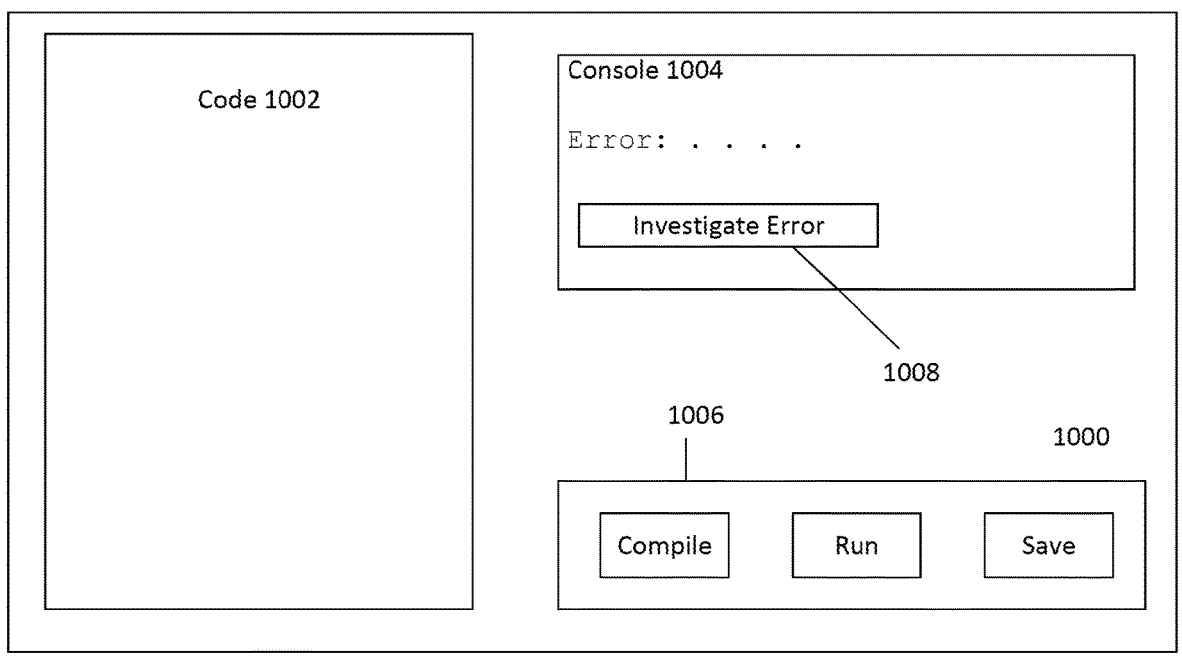
FIGS. 10A-F illustrate exemplary user interfaces for use with a programming co-pilot system.

FIG. 10A illustrates an exemplary interface 304 of an editor 302 for providing access to the programming co-pilot system 340. A user interface 1000 is illustrated and includes a code editing container 1002 for editing the code, a console container 1004 for viewing compiler and program execution output, and a control menu 1006 presenting options to compile, run, or save the code. In this example, running the code produces an error, and an error message is displayed in the console container 1004. Adjacent to the error in the console container 1004, an investigation link 1008 is provided which may be used to investigate the error in the programming co-pilot system 340. In an embodiment, the error detection system 342 may be used to identify when running the code produces an error. In an embodiment, the error prediction system 344 may be automatically applied to the code when the code is edited, run, or saved. When the error prediction system predicts the error, the error and the investigation link may be preemptively displayed in the console window. In an embodiment, an interface to investigate the error is launched upon detection or prediction of an error instead of the investigation link being provided. In some embodiments, an autocorrection link may be provided in addition to or in replacement of the investigation link. The autocorrection link may automatically apply a set of changes to the code to attempt to remove the error. For example, a set of changes produced by the fix prediction system 350 may be applied. In some embodiments, a fix predicted by the fix prediction system 350 may be applied automatically when the user saves or runs the file. In other embodiments, the predicted fix may be applied as soon as it is predicted. For example, it may be applied without waiting for user approval or acceptance.

Figure 10B:
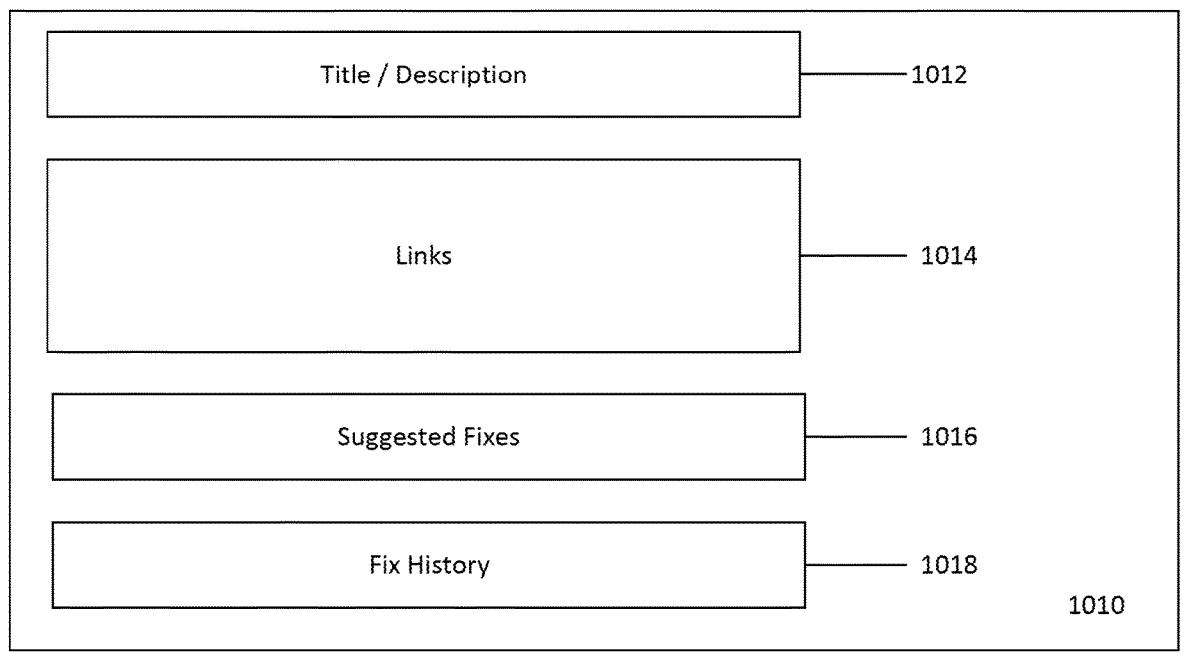

FIG. 10B illustrates an exemplary interface 304 for investigation of an error in the programming co-pilot system 340. A user interface 1010 is illustrated and includes an error information container 1012, an additional links container 1014, a suggested fix container 1016, and a fix history container 1018. The error information container 1012 may display one or more error details, such as an error message, an error type, or a description of the error. The description of the error may optionally include a natural language, textual description. The additional links container 1014 may display links to online resources relevant to the error. For example, links to Google search results, Stack Overflow question pages, or Github comments may be displayed. The links may be retrieved from a database, automatically fetched by searching for the error on a list of websites, or generated using rules-based heuristics. The suggested fix container 1016 may display a list of one or more suggested change sequences to the code which may remove the error. Each suggested change sequence may be summarized by one or more details, such as a title, a short description, a portion of corrected code, or a portion of code with markup to demonstrate the suggested change sequence. The markup may be for example a diff of code before and after a fix to correct an error. In some embodiments, a user interface element on interface 1010 displays the code example that caused the error, without displaying a corresponding fix. The code example that causes the error may be detected by the error detection system 348 or generated by the training data generation system 352. In an embodiment, one or more suggested change sequences may be produced by the fix prediction system 350. The suggested change sequences may also be previously received and stored from other users who encountered the same error. Submissions of fixes for the error may be received from other users, such as manually generated fixes or fixes that are automatically predicted by the fix detection system 348. The suggested fix container 1016 may be expandable or linked to a detailed view. In some embodiments, the suggested fix container 1016 groups suggested fixes into categories, such as categories determined by structure or type. For examples, fixes involving a typo may be grouped. In some embodiments, a title or description of the categories of fixes may be determined and displayed. The fix history container 1018 may display information about suggested change sequences selected by the user or one or more colleagues of the user in the past. For example, a suggested change sequence may be displayed corresponding to a suggested change sequence last applied or most commonly applied by the user while investigating one or more similar errors in the past. In another example, a suggested change sequence may be displayed corresponding to a suggested change sequence last applied or most commonly applied by the colleagues of the user while investigating one or more similar error in the past. Similar errors may be identified by comparing error message, comparing error type, or using the error classification system 346. In an embodiment, a plurality of suggested change sequences may be displayed, ranked by likelihood that the user selects a particular suggested change sequence using a machine learning model trained on suggested change sequences selected by the user or colleagues of the user in the past. In some embodiments, when information about suggested change sequences selected by the colleagues of the user in the past is displayed, one or more contact links for contacting the colleagues of the user may be displayed. Each contact link may provide access to one or more mechanisms for communicating with at least one colleague, such as email, phone call, video call, a messaging application, or other mechanism. In an embodiment, the contact links may be sorted or filtered based on attributes of the user or attributes of the colleagues of the users. For example, the contact links may be sorted or filtered based on recency or frequency each colleague has encountered the error or fixed the error. Recency or frequency may be calculated over all past encounters, encounters within a fixed window of time, or encounters determined by rule-based heuristics. In another example, the contact links may be sorted or filtered based on a relatedness score of code that the user and each colleague edit. In an embodiment, relatedness score may be determined by comparing the number of functions or files which both the user and a colleague have edited to the number of functions or files which only one of the user or a colleague have edited. In an embodiment, relatedness may be determined by comparing the semantic or syntactic similarity of files the user has edited and files the colleague has edited. In another example, the contact links may be sorted or filtered based on a familiarity score of each colleague with the code containing the error. In an embodiment, familiarity score may be determined using rule-based heuristics on original authorship of the code, number of edits to the code, recency of edits to the code, original authorship of other code which references or uses the code, number of edits to other code which references or uses the code, and recency of edits to other code which references or uses the code. In another example, the contact links may be sorted or filtered based on availability metrics such as tenure of each colleague, current online presence of each colleague on a team chat, email, or communication system, or current activity level of each colleague. In some embodiments, the fix history container 1018 may be hidden when the number of records of past investigation of similar errors by the user or colleagues of the user is below a threshold value.

Figure 10C:
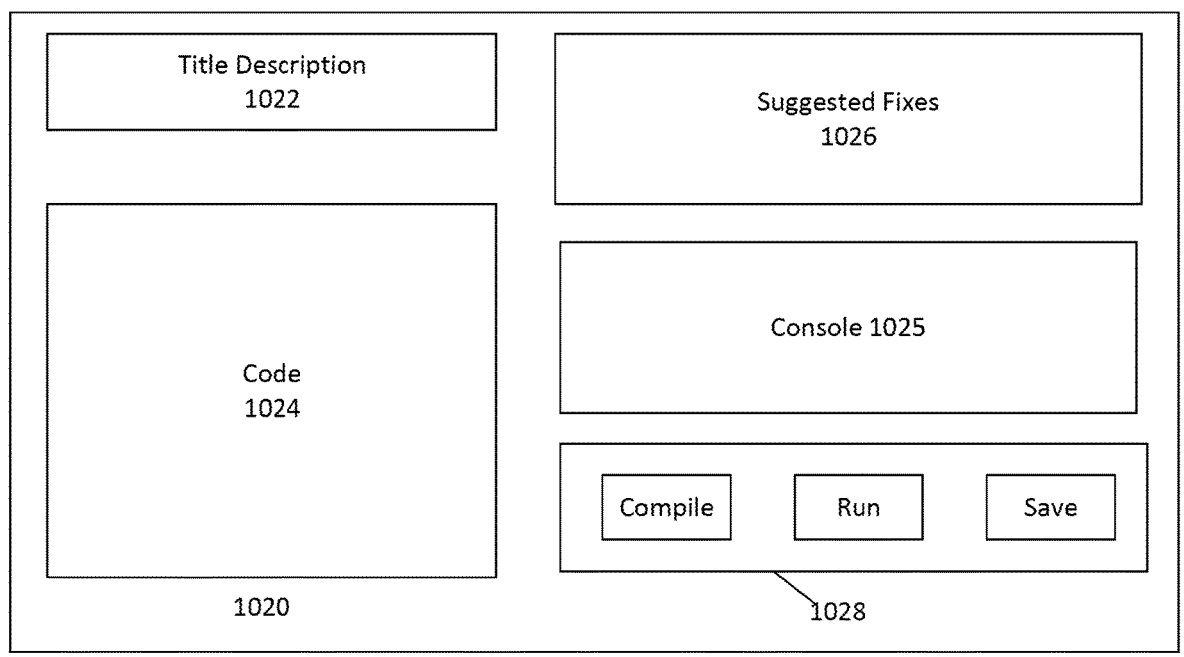

FIG. 10C illustrates an exemplary interface 304 for interacting with one or more suggested fixes. A user interface 1020 is illustrated and includes an error information container 1022, a code editing container 1024, a suggested fix container 1026, and a control menu 1028 presenting options including an option to test changes, an option to apply changes, and an option to share changes. The error information container 1022 may display one or more error details, such as an error message, an error type, or a description of the error. In an embodiment, the error information container 1022 may display the same information as the previous error information container 1012. The code editing container 1024 may display a code segment comprising at least a portion of the code from code editing container 1002. The code segment may be editable. The code editing container 1024 may be treated as a sandbox, wherein changes to the code segment do not affect code outside the sandbox, such as the code from code editing container 1002. The suggested fix container 1026 may display a list of one or more suggested change sequences to the code which may remove the error. Each of the suggested change sequences may be summarized by one or more details, such as a title, a short description, a portion of corrected code, or a portion of code with markup demonstrating the suggested change sequence. In an embodiment, each suggested change sequence may show at least the details shown in suggested fix container 1016 and additional detail not shown in suggested fix container 1016. In an embodiment, interacting with a suggested change sequence may apply the change to the code in the code editing container 1024. In an embodiment, one or more suggested change sequences may be produced by the fix prediction system 350. In an embodiment, one or more suggested change sequences may be produced by aggregating examples from a database of changes applied to similar code examples. The change sequences may also be determined from the artificial training data, which may include associated corrections to erroneous code. In the control menu 1028, when the option to test changes is selected, the code segment in the code editing container 1024 may be compiled and executed to test if the error was removed. Console 1025 may display the results of compilation and execution of the code. A result such as an error message or code output may be displayed in the console 1025. In the control menu 1028, when the option to share changes is selected, the code segment, the error details, and a record of changes made to the code segment may be saved to a local file, remote file, or database. In some embodiments, when the option to share changes is selected, an additional interface may be presented. In an embodiment, when the option to share changes is selected, an additional option may be presented to set a scope of sharing. For example, the scope of sharing may be set to inform training examples for machine learning but not be viewable by other users, to be viewable subset of users such as colleagues of the user, or to be viewable by all users. In some embodiments, when the option to share changes is selected, an additional option to sanitize or anonymize the changes may be presented. In an embodiment, the additional option may be applied automatically or based on a configuration setting. For example, the code sample may include one or more extraneous lines of code which are not changed and are not relevant to the error. The extraneous lines may be removed from the code segment. In an embodiment, the extraneous lines of code may be identified and removed by automatic trial and error, by using rules-based heuristics such as excluding code outside the scope of a function, or by using a machine learning model using a learning algorithm such as a model trained to predict a relevance score for each line of code given an error, wherein lines of code with relevance score below a threshold value are removed. In another example, the code sample or the error details may include one or more proprietary identifiers such as variable names or function names specific to the user. The proprietary identifiers may be replaced with generic identifiers. The proprietary identifiers may be identified by using rules-based heuristics such as comparing to a known list of proprietary names or using a machine learning model trained as a named entity recognizer. Generic identifiers may be generated randomly, assigned from a list, or assigned using rules-based heuristics. In the control menu 1028, when the option to apply changes is selected, changes made to the code segment in the code editing container 1024 may be applied to the code in the code editing container 1002. In an embodiment, a share prompt may be displayed which presents the user with an option to also share the changes. In an embodiment, a prompt may only display if an interest score is calculated to be above a threshold value. The interest score may be calculated using information such as frequency that the error is encountered, frequency that changes are shared for the error, or uniqueness of changes applied to the code as compared to changes which were previously shared.

Figure 10D:
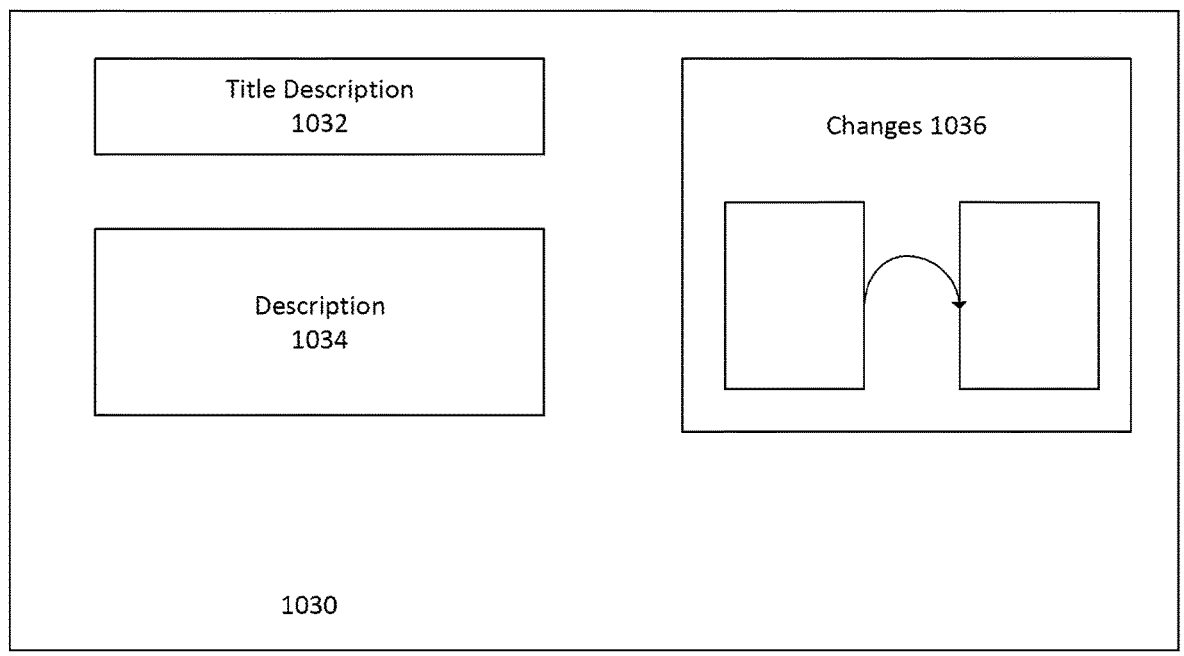

FIG. 10D illustrates an exemplary interface 304 for annotation of a set of changes shared from user interface 1020. A user interface 1030 is illustrated, which includes a fix title container 1032, a fix description container 1034, and a code change container 1036. The fix title container 1032 may comprise a text field wherein the user may enter one or more words. Optionally, the fix title container may be initialized with a default text. In an embodiment, the default text may comprise an error message or error type associated with the error removed by the set of changes shared from user interface 1020. In an embodiment, the default text may be selected from a database. In an embodiment, the default text may be automatically generated using a machine learning model. The fix description container 1034 may comprise a text field wherein the user may enter one or more words. In an embodiment, the fix description container may be autofilled with text by matching the text entered in the fix title container with text in a database. The code change container 1036 may display the set of changes shared from user interface 1020. In an embodiment, the code change container 1036 may display an original code segment and a changed code segment, wherein the changed code segment is the original code segment with the changes shared from user interface 1020 applied. In an embodiment, the code change container 1036 may display text with markup which illustrates the changes shared from user interface 1020. In some embodiments, user interface 1030 may be configured to enable annotation of a plurality of sets of changes concurrently. For example, the fix title container, fix description container, and code change container may be repeated for each set of changes. In an embodiment, interface 1030 is accessible from a link or interface element on interface 1000. When selection of the autocorrection link from interface 1000 is received from the user, the system displays interface 1030 to show the annotated changes. In an embodiment, a return on investment (ROI) value is predicted to determine whether to display interface 1030. The ROI value may be based on both the confidence value in the fix and also the predicted value of the fix. When the fix is determined to be commonly occurring, based on a comparison with other fixes, then the ROI for sharing the fix is relatively lower, and it is less likely that the share interface will be displayed. However, if the fix is uncommon, then the ROI of sharing the fix is higher and the display 1030 is more likely to be displayed. Moreover, if the programming co-pilot system 340 detects that many users are encountering the error, then the ROI of sharing the fix is higher and the display 1030 is more likely to be displayed.

In an embodiment, sharing the fixes may store the fixes for display in a community. The community may be public or private and may be accessible through, for example, a website, an application, or other methods. The community may be a part of the programming co-pilot system 340 or may be a separate component. The shared fixes in the community may comprise a data set that may provide examples of fixes that users may reference in order to address future errors and fixes. The fixes may include associated data such as source code or portions thereof that include the fix. In addition, fixes may include associated user discussion or user-written explanations about the fixes.

The community may include storage of any or all of the data collected by the programming co-pilot system 340. In an embodiment, the community stores a data set of error messages, stack traces, and code of users. This information may be used for error canonicalization and error prediction. In addition, the raw data about subsequent edits may be stored, which may be used for isolating fixes in code and may help with fix prediction. Moreover, manually isolated fixes in code may also be stored.

The community may also include tools for finding other users who can act as experts about an error or fix. In an embodiment, the community may include a display of users who have previously encountered an error or have used a particular fix. In one embodiment, the community may store the specific fix used by a user. In addition, an edit stream showing the edits that a user made to the source code to implement the fix may be stored and be available for display. One or more methods of filtering users may be provided. For example, users performing a query may filter other users, who are potential experts, based on how recently they got an error or used the fix, how frequently they got an error or used the fix, on their experience with parts of the codebase that contain the error or fix, the amount of overlap of experience between the querying user and the expert user, whether the querying user and the expert user have worked together before, whether the expert user is in the querying user's chat list, and whether the expert user is online.

In an embodiment, the programming co-pilot system 340 may also store a journal for the user. In an embodiment, the journal may comprise the private data of the user, some of which may be automatically collected by the programming co-pilot system 340. For example, the journal may store information about each of the prior errors encountered by the user and the associated fixes. For each error encountered by the user, the system may store an associated fix that fixed the error. It may also stored an edit stream of the edits that led to the fix. The user may then query to find past errors and how he or she fixed them. In some embodiments, a manual query is not required. When the system detects that the user has encountered an error, it may automatically search the journal for prior instances where the user encountered the error. It may then return an associated fix or other information such as a prior stack trace, relevant discussions or explanations, web links to relevant information, and so on.

Figure 10E:
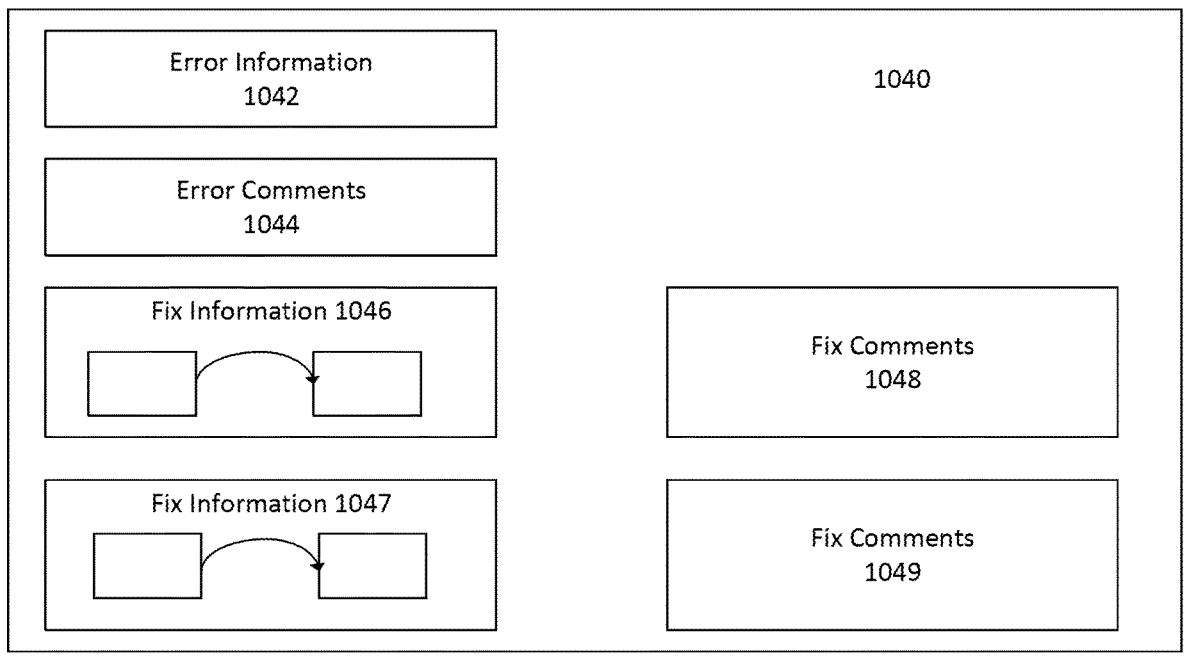

FIG. 10E illustrates an exemplary interface 304 for discussion of error fixes. A user interface 1040 is illustrated, which contains an error information container 1042, an error comment container 1044, one or more fix information containers 1046-1047, and one or more fix comment containers 1048-1049. The error information container 1042 may display information about a discussed error. The information may include an error message, an error type, or a description of the error. The error comment container 1044 may comprise an interactive element allowing users to post comments about the discussed error. In an embodiment, a mechanism is provided in the error comment container to link to fix information containers on the page. The one or more fix information containers 1046-1047 may each display information about a suggested change sequence which may be applied to remove the discussed error. Information displayed in the fix information containers may include a title, a short description, a portion of corrected code, or a portion of code with markup demonstrating the suggested change sequence. The fix information containers may also contain indications of the identities of team members who used or contributed content to the change sequences and user interface elements for contacting the team members, such as by email, chat, messaging, text, or other methods. In some embodiments, an option may be provided to tag a plurality of fix information containers as related. For example, a plurality of fix information containers may describe suggested change sequences that are functionally identical and may be combined or de-duplicated. In another example, a plurality of fix information containers may describe suggested change sequences that follow a similar theme or strategy. In an embodiment, a plurality of fix information containers may be automatically tagged as related by comparing attributes such as the title, short description, or suggested change sequence. The one or more fix comment containers 1048-1049 may comprise interactive elements allowing users to post comments about a suggested change sequence described in a corresponding fix information container. Each fix comment containers 1048-1049 may be placed adjacent to a fix information container or placed in another way which indicates which fix information container each fix comment container corresponds to. In an embodiment, interfaces 1040 and 1010 may be combined, so that the interface elements on each interfaces 1040 and 1010 appear on one display.

Figure 10F:
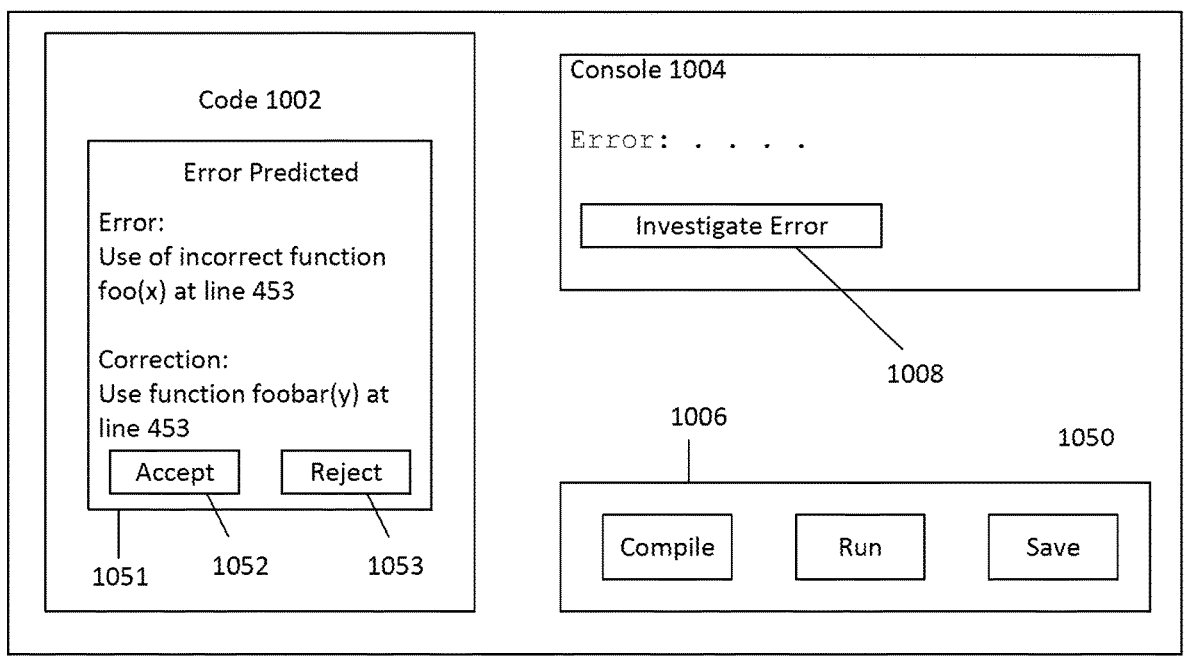
Figure 11:
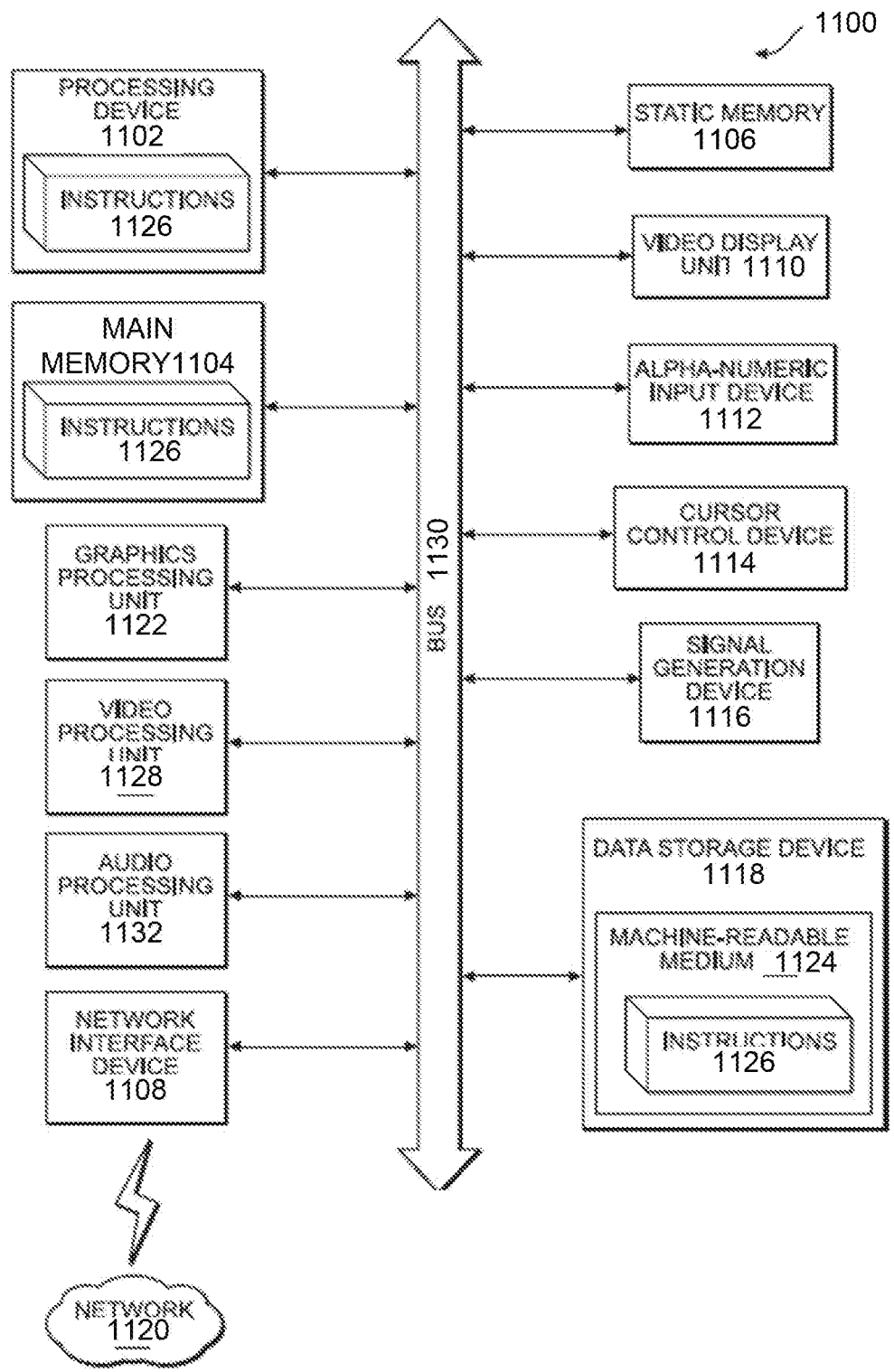
FIG. 11 illustrates an example computer system for use in some embodiments.

FIG. 10F illustrates an exemplary interface 304 for displaying a predicted error or predicted fix or both to the user in a less invasive manner. A user interface 1050 is illustrated, which contains similar elements to container 1000. User interface 1050 may include a code editing container 1002 for editing the code, a console container 1004 for viewing compiler and program execution output, and a control menu 1006 presenting options to compile, run, or save the code. In this example, running the code produces an error, and an error message is displayed in the console container 1004. Adjacent to the error in the console container 1004, an investigation link 1008 is provided which may be used to investigate the error in the programming co-pilot system 340. It may be desirable to display predicted errors or fixes, or both, to the user. In an embodiment, the predicted errors may be predicted by error prediction system 344 through error prediction method 600. In an embodiment, the predicted fixes may be predicted by fix prediction system 350 through fix prediction method 700. In an embodiment, in order to minimize the negative effects of a false positive (a predicted error when no error exists) by the error prediction system 344 or fix prediction system 350, a display of the predicted error or fix is shown temporarily and disappears if the user does not accept it. After an error is predicted, a predicted error dialog box 1051 may be displayed. The predicted error dialog box 1051 may also include a display of a predicted fix for fixing the error. It also may include an accept button 1052 and reject button 1053. In an embodiment, the predicted error dialog box 1051 is displayed for a threshold period of time after the error is predicted. The threshold period of time may be, for example, 1-3 seconds, 1-5 seconds, 1-10 seconds, 2-10 seconds, 3-10 seconds, or 3-8 seconds. If the accept button 1052 is activated by the user, then the predicted fix is applied to the code in the code editing container 1002. However, if the reject button 1053 is activated by the user, then the predicted fix is not applied. Also, if the threshold time elapses without the accept button 1052 being activated, then the predicted fix is not applied. The predicted error and fix may be inferred to be incorrect and dismissed forever. While predicted error dialog box 1051 is shown for example, a variety of other interface component types may be used. For example, a pop-up box, modal, window, tab, or other interface element may be used for displaying the predicted error or predicted fix. In an embodiment, the predicted error may also be displayed in the console container 1004. The predicted error may be removed from the console container 1004 if the reject button 1053 is activated or if the threshold time elapses. In one embodiment, the amount of time until the predicted error dialog is dismissed is displayed to the user as a countdown timer. When the countdown expires, the predicted error dialog box 1051 may be dismissed. In addition, the feedback from the user in pressing the accept button 1052 or reject button 1053 or allowing the threshold time to elapse may be used to generate additional training data for the error prediction system 344 or fix prediction system 350. The feedback from the user may be stored as the ground truth associated with the predicted error and predicted fix. The pair comprising the ground truth and the predicted error or predicted fix may be added to a database of training examples for training the error prediction system 344 or fix prediction system 350.FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1115 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to the components of a device to perform the disclosure herein. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1: A computer-implemented method comprising: monitoring a communication channel, the communication channel for collecting error information of an execution environment, compiler, or interpreter, the execution environment configured to execute computer code; parsing content in the communication channel and identifying an error;

identifying and storing error context of the error; determining whether the error was handled successfully or needs attention.

Example 2: The computer-implemented method of Example 1, wherein identifying an error in the content of the communication channel is performed by a machine learning algorithm, Example 3: The computer-implemented method of Example 2, wherein the machine learning algorithm is a neural network.

Example 4: The computer-implemented method of Example 1, wherein the error context comprises a stack trace.

Example 5: The computer-implemented method of Example 4, wherein the stack trace indicates a portion of source code and the error context further includes the indicated portion of source code.

Example 6: The computer-implemented method of Example 1, wherein evaluating the error status of the error is performed by a machine learning algorithm.

Example 7: The computer-implemented method of Example 6, wherein the machine learning algorithm is a neural network.

Example 8: A computer-implemented method comprising: providing a plurality of training examples, each training example comprising error text and an error type label; determining one or more features from the error text in the training examples, wherein the features are based on one or more words or tokens in the error text; training a machine learning model using the plurality of training examples; providing an unseen error text; inputting the unseen error text into the machine learning model; generating, by the machine learning model, a prediction of an error type label of the unseen error text.

Example 9: The computer-implemented method of Example 8, wherein the machine learning model is a neural network.

Example 10: The computer-implemented method of Example 8, wherein the error type labels of the plurality of training examples are generated by a clustering algorithm.

Example 11: The computer-implemented method of Example 8, wherein the error type labels of the training examples are extracted from error text.

Example 12: The computer-implemented method of Example 8, wherein the error type labels of the training examples are generated by hand labeling.

Example 13: The computer-implemented method of Example 8, further comprising: wherein the training examples further comprise a stack trace; determining one or more features from the stack traces in the training examples.

Example 14: A computer-implemented method comprising: providing a portion of source code in a code editor; processing the portion of source code to extract a plurality of features of the source code, wherein the plurality of features are based on the source code; inputting the features into a machine learning model; generating, by the machine learning model, a prediction of whether the portion of source code contains an error.

Example 15: The computer-implemented method of Example 14, wherein the machine learning model is a neural network.

Example 16: The computer-implemented method of Example 14, further comprising: when the machine learning model predicts that the source code contains an error, predicting an error type of the error.

Example 17: The computer-implemented method of Example 14, further comprising: when the machine learning model predicts that the source code contains an error, predicting an error text of the error.

Example 18: The computer-implemented method of Example 14, wherein the machine learning model is trained using labeled training examples that are web scraped from online data sources, wherein the online data sources comprise crowd-sourced data.

Example 19: The computer-implemented method of Example 18, wherein a plurality of the labeled training examples include an identification of a type of error in the training code portion.

Example 20: The computer-implemented method of Example 14, further comprising generating a prediction of a location in the source code containing the error.

Example 21: The computer-implemented method of Example 14, further comprising generating a prediction of a stack trace of the error Example 22: The computer-implemented method of Example 14, further comprising: displaying the prediction and an interface element for accepting the prediction; when the prediction is not accepted in a threshold amount of time, dismissing the prediction.

Example 23: The computer-implemented method of Example 22, further comprising: generating a training set for the machine learning model based on a plurality of predictions being accepted or not accepted.

Example 24: A computer-implemented method comprising: launching a code editor; loading source code from memory and displaying it in the code editor; monitoring and storing a first set of edits made to the source code by a programmer; receiving a first request to compile the source code into an executable program; receiving an indication of an error in the source code as a result of running the executable program; monitoring and storing a second set of edits made to the source code by the programmer; receiving a second request to compile the source code into an executable program, and successfully running the executable program; displaying the second set of edits and an indication that the second set of edits corrects the error in the source code.

Example 25: A computer-implemented method comprising: providing a portion of source code, wherein the portion of source code contains an error; providing error information about the error in the source code; inputting the portion of source code and error information into a machine learning model, the machine learning model trained on a plurality of training examples, the plurality of training examples comprising code portions, information about errors in the code portions, and fixes of the errors, wherein the fixes of the errors comprise sequences of changes to the code portions; generating, by the machine learning model, a predicted fix for the error in the source code.

Example 26: The computer-implemented method of Example 25, wherein the machine learning model is a neural network.

Example 27: The computer-implemented method of Example 20, wherein the machine learning model is trained using backpropagation.

Example 28: The computer-implemented method of Example 20, wherein the error is a runtime error.

Example 29: The computer-implemented method of Example 20, wherein the error is a compile-time error.

Example 30: A computer-implemented method comprising: receiving a code portion, wherein the code portion is error-free; making a sequences of pseudo-random changes to the code portion to create an error-containing code portion; compiling the error-containing code portion and receiving a compile-time error, the compile-time error including error information; reverting the pseudo-random changes to obtain a sequence of fixing changes; training a machine learning model to predict fixing changes for the compile-time error by using the sequence of fixing changes, the compile-time error, the error information, and the error-containing code portion as a training example.

Example 31: The computer-implemented method of Example 30, further comprising: training the machine learning model using a plurality of training examples.

Example 32: The computer-implemented method of Example 30, wherein the machine learning model is a neural network.

Example 33: A computer-implemented method comprising: displaying a code editor; monitoring for user input and modifying source code in the code editor; detecting an error in the source code; displaying links to a plurality of online resources related to the error, the plurality of online resources including crowd-sourced information about the error; displaying, in a suggested fix container, a list of suggested changes to the source code to fix the error; displaying, in a fix history container, past changes made by a first group of other users to fix the error.

Example 34: The computer-implemented method of Example 33, wherein the list of suggested changes to the source code are shown using markup.

Example 35: The computer-implemented method of Example 33, further comprising providing an option to share changes made to the source code to share the changes with a second group of other users.

Example 36: The computer-implemented method of Example 35, wherein at least some of the source code is anonymized before sharing the changes with the second group of other users.

Example 37: The computer-implemented method of Example 35, further comprising presenting an interface for receiving user annotations about changes made to the source code.

Example 38: A computer-implemented method comprising: providing a portion of source code in a code editor; processing the portion of source code to extract a plurality of features of the source code, wherein the plurality of features are based on the source code; inputting the features into a machine learning model; generating, by the machine learning model, a prediction of whether the portion of source code contains an error.

Example 39: The computer-implemented method of Example 38, further comprising: inputting the features and the error into a second machine learning model for fix prediction; generating, by the second machine learning model, a prediction of a fix to the error.

Example 40: A computer-implemented method comprising: monitoring a communication channel, the communication channel for collecting error information of an execution environment, compiler, or interpreter, the execution environment configured to execute computer code; parsing content in the communication channel and identifying an error; identifying and storing error context of the error; determining whether the error was handled successfully or needs attention.

Example 41: The computer-implemented method of claim 41, further comprising: storing a record of the error in a journal.

Example 42: The computer-implemented method of claim 40, further comprising: detecting, at a second time, an error; searching the journal for prior occurrences of the error; displaying one or more of the prior occurrences to a user.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
monitoring a communication channel, the communication channel comprising information of an execution environment, compiler, or interpreter, the execution environment configured to execute computer code;
parsing the information in the communication channel and identifying an error, wherein the information comprises computer code and standard output, execution state, execution status, logs or streams of data generated as a result of execution, compiling or interpreting of the computer code;
identifying and storing error text and error context of the error, wherein the error context comprises portions of computer code responsible for the error, configuration settings, or execution state at the time of the error;
extracting one or more features from the error text and error context;
predicting, based on the one or more extracted features, one or more error types of the error, wherein the predicting comprises determining a likelihood for each of the one or more error types;
classifying, based on the determined likelihood of the one or more error types, the error into one or more error types;
predicting, based on the error type, error text and error context, a suggested fix, wherein the suggested fix comprises one or more corrected code segments;
incorporating the suggested fix in the computer code; and
determining whether the error was handled successfully by the incorporating of the suggested fix.

2. The computer-implemented method of claim 1, wherein identifying an error in the content of the communication channel is performed by a machine learning algorithm.

3. The computer-implemented method of claim 2, wherein the machine learning algorithm is a neural network.

4. The computer-implemented method of claim 1, wherein the error context comprises a stack trace.

5. The computer-implemented method of claim 4, wherein the stack trace indicates a portion of source code and the error context further includes the indicated portion of source code.

6. The computer-implemented method of claim 1, wherein evaluating an error status of the error is performed by a machine learning algorithm.

7. The computer-implemented method of claim 6, wherein the machine learning algorithm is a neural network.

* * * * *